(12) United States Patent
Aoki et al.

(10) Patent No.: US 10,137,929 B2
(45) Date of Patent: Nov. 27, 2018

(54) ELECTRIC POWER STEERING DEVICE FOR VEHICLE

(71) Applicants: Kenichiro Aoki, Miyoshi (JP); Kenji Shibata, Nagoya (JP); Takayoshi Tsujimoto, Susono (JP)

(72) Inventors: Kenichiro Aoki, Miyoshi (JP); Kenji Shibata, Nagoya (JP); Takayoshi Tsujimoto, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/650,706

(22) PCT Filed: Jan. 24, 2013

(86) PCT No.: PCT/JP2013/051390
§ 371 (c)(1),
(2) Date: Jun. 9, 2015

(87) PCT Pub. No.: WO2014/115275
PCT Pub. Date: Jul. 31, 2014

(65) Prior Publication Data
US 2015/0314804 A1   Nov. 5, 2015

(51) Int. Cl.
*B62D 5/30*   (2006.01)
*B62D 5/04*   (2006.01)

(52) U.S. Cl.
CPC ......... *B62D 5/0484* (2013.01); *B62D 5/0463* (2013.01)

(58) Field of Classification Search
CPC .... B62D 5/008; B62D 5/0463; B62D 5/0487; B62D 5/0484
See application file for complete search history.

(56) References Cited

U.S. PATENT DOCUMENTS

| 6,158,545 A | * | 12/2000 | Kaji | B62D 5/065 180/446 |
| 2003/0079932 A1 | * | 5/2003 | Ono | B62D 5/008 180/407 |

(Continued)

FOREIGN PATENT DOCUMENTS

| JP | 2003212141 A | * | 7/2003 |
| JP | 2011-78230 | | 4/2011 |

OTHER PUBLICATIONS

International Search Report dated Feb. 19, 2013, in PCT/JP2013/051390 filed Jan. 24, 2013.

*Primary Examiner* — Adam D Tissot
*Assistant Examiner* — Aaron C Smith
(74) *Attorney, Agent, or Firm* — Oblon, McClelland, Maier & Neustadt, L.L.P.

(57) ABSTRACT

An electric power steering device for a vehicle includes a plurality of assist systems electromagnetically driving an electric motor. When a first or second assist system malfunctions, a malfunction state assist amount calculation part calculates an assist amount while decreasing a limit value at the vehicle stopping, to an amount smaller than a limit value at the vehicle moving. When a malfunction such as a disconnection or a fixing of the switching elements occurs in the first or second assist systems on the basis of a judgment result of a malfunction judgment function, an assist amount switching part supplies an assist amount received from the malfunction state assist amount calculation part to first and second motor drive control parts. When a malfunction occurs in one of the first and second assist systems, one of the first and second motor drive control parts drives the motor by using the assist amount.

9 Claims, 12 Drawing Sheets

(56) References Cited

U.S. PATENT DOCUMENTS

2011/0074333 A1     3/2011  Suzuki
2011/0156629 A1     6/2011  Satou et al.
2011/0315470 A1*   12/2011  Uryu .................... B62D 5/0487
                                                            180/446

* cited by examiner

ELECTRIC POWER STEERING DEVICE FOR VEHICLE

TECHNICAL FIELD

The invention relates to an electric power steering device for a vehicle provided with an electric motor for adding a predetermined assist force for assisting the manipulation of the steering wheel by the driver and in particular, relates to an electric power steering device for a vehicle provided with an electric motor and a plurality of assist systems for electromagnetically driving the electric motor.

BACKGROUND ART

Conventionally, for example, a control device for a multi-phase rotary machine shown in the Patent Literature 1 described below and an electric power steering device using the control device are known. According to the conventional control device for the multi-phase rotary machine, when any of a group of a plurality of MOSs forming a first inverter part and a group of a plurality of MOSs forming a second inverter part is fixed at the ON state and thus, a short occurs in a system of one of the first and second inverter parts, a control part is configured to control all of the MOSs of the malfunctioning system to the OFF state to stop driving the motor by the malfunctioning system. Further, the control part is configured to control the MOSs of the normal system so as to cancel the brake torque generated in the malfunctioning system or reduce the influence on the driving of the motor.

CITATION LIST

Patent Literature

[PTL. 1]
 JP 2011-78230 A

SUMMARY OF INVENTION

As in the conventional device, in the case that the device includes a plurality of the inverter parts (the assist systems), when a malfunction occurs in one of a plurality of the inverter parts (the assist systems), the torque (the assist force) generated by the driving of the electric motor may be smaller than the torque (the assist force) generated by the driving of the electric motor under the normal state. Under a state where the torque (the assist force) generated by the electric motor decreases, in particular, in order to turn the turning wheels at the vehicle stopping, the electric motor is subject to a large load and thus, the electric motor and the drive circuits (the inverters) generate heat and as a result, the temperatures of the electric motor and the drive circuits (the inverters) become high. In this case, in order to prevent the overheating, the torque (the assist force) added by the driving of the electric motor may be limited and thus, may further decrease.

Further, just after the vehicle starts moving under the situation described above, the temperature of the electric motor is still high and thus, the limitation of the torque (the assist force) may be continued. In this case, when the driver manipulates the steering wheel to turn the turning wheels, the torque (the assist force) is smaller than the torque (the assist force) under the normal state and as a result, the driver may feel a discomfort due to a shortage of the torque (the assist force).

The invention is made for solving the problem described above and one of the objects of the invention is to provide an electric power steering device for a vehicle in which the driver is not likely to feel a discomfort due to the change of the assist force when the assist is continued under a state where a malfunction occurs in any of a plurality of the assist systems.

In order to accomplish the object described above, the electric power steering device for the vehicle comprises an electric motor, a plurality of assist systems and assist control means. The electric motor adds a predetermined assist force for assisting the steering wheel manipulation by the driver and at least one electric motor is provided. The assist systems is configured to include the electric motor and electromagnetically drive the electric motor. In particular, the assist systems include a plurality of wire winding groups provided in the electric motor and drive circuits connected to the wire winding groups, respectively. The assist control means calculates an assist amount for representing the predetermined assist force by using the manipulation force input by the driver via the steering wheel and control the assist to the steering wheel manipulation by using at least one of the assist systems on the basis of the calculated assist amount.

One of the features of the electric power steering device for the vehicle according to the invention is that when a malfunction occurs in at least one of the assist systems, the assist control means is configured to:

control the maximum assist amount at the vehicle stopping which represents the maximum assist force added by the electric motor at the vehicle stopping to an amount smaller than the maximum assist amount at the vehicle moving which represents the maximum assist force added by the electric motor at the vehicle moving;

calculate an assist amount at the vehicle stopping or moving; and control the assist to the steering wheel manipulation by using the assist system under a normal state other than the malfunctioning assist system of the assist systems on the basis of the calculated assist amount at the vehicle stopping or moving.

In this case, the assist control means may include:

malfunction occurring judgment means for judging if a malfunction occurs in at least one of the assist systems; and assist amount calculation means for calculating the assist amount at the vehicle stopping or moving while controlling the maximum assist amount at the vehicle stopping which represents the maximum assist force added by the electric motor at the vehicle stopping to an amount smaller than the maximum assist amount at the vehicle moving which represents the maximum assist force added by the electric motor at the vehicle moving.

Further, in this case, the electric power steering device for the vehicle may comprise manipulation force detection means for detecting the manipulation force input by the driver via the steering wheel, and the assist control means may calculate the assist amount by using the manipulation force detected by the manipulation force detection means.

Furthermore, in this case, the electric power steering device for the vehicle may comprise vehicle speed detection means for detecting the vehicle speed, and the assist control means may judge if the vehicle stops or moves by using the vehicle speed detected by the vehicle speed detection means and calculate the assist amount at the vehicle stopping or moving.

In this regard, the vehicle stops when the vehicle speed is zero or when the vehicle moves at an extremely low vehicle speed.

In these cases, the maximum assist amount at the vehicle moving may be controlled to an amount smaller than or equal to the assist amount which represents the upper limit of the assist force capable of being generated by the electric motor included in the assist system under the normal state.

Further, in these cases, when a malfunction occurs in at least one of the assist systems, the assist control means may calculate the assist amount at the vehicle stopping or moving on the basis of a relationship between the manipulation force input by the driver and the assist amount which represents the assist force added by the electric motor and applied to between the maximum assist amounts at the vehicle stopping and moving.

Furthermore, in this case, a relationship between the manipulation force and the assist amount under a state where no malfunction occurs in the assist systems may be employed as the relationship between the manipulation force input by the driver and the assist amount which represents the assist force added by the electric motor.

Thereby, in particular, when a malfunction occurs in at least one of the assist systems, the assist amount at the vehicle stopping or moving may be calculated by using:

the maximum assist amount (the limit value) at the vehicle moving which is determined as an amount smaller than or equal to the assist amount which represents the upper limit of the assist force capable of being generated by the electric motor included in the assist system under the normal state; and the maximum assist amount (the limit value) at the vehicle stopping which is controlled to an amount smaller than the maximum assist amount at the vehicle moving.

Thereby, in particular, when the vehicle stops, the maximum assist amount is decreased and thus, the assist force (the assist amount) added by the electric motor included in the assist system under the normal state, that is, the load to the electric motor can be reduced. Therefore, the amount of the heat generated by the driving of the electric motor can be effectively reduced and thus, for example, even when the load to the electric motor is likely to increase due to the stationary steering such as the manipulation of the steering wheel to turn the turning wheels at the vehicle stopping, the overheating of the electric motor can be appropriately prevented. In addition, because the overheating can be appropriately prevented, it is not necessary to provide separate heat radiation means.

Further, when the vehicle stops, the amount of the heat generated by the driving of the electric motor can be reduced and thus, the limitation of the assist force (the assist amount) for preventing the overheating is reduced. Thereby, in the case that the driver starts moving the vehicle, the limitation of the assist force (the assist amount) carried out for preventing the overheating is small and thus, the appropriate large assist amount (the appropriate large assist force) can be added by using the assist system under the normal state even if the steering wheel is manipulated just after the vehicle starts moving. Therefore, the driver is not likely to feel a discomfort due to a shortage of the assist amount (the assist force).

Further, the other features of the electric power steering device for the vehicle according to the invention is that when an acquired temperature acquired at a portion which generates heat due to the driving of the electric motor included in at least the assist system under the normal state of the assist systems exceeds a predetermined temperature, the assist control means calculates one of the assist amounts at the vehicle stopping and moving while decreasing the maximum assist amounts at the vehicle stopping and moving as the acquired temperature rises.

In this case, the assist control means may include temperature acquisition means for acquiring the temperature of the portion, which generates heat due to the driving of the electric motor, by a detection or an estimation, and the assist control means may use an acquired temperature acquired at a portion which generates heat due to the driving of the electric motor included in at least the assist system under the normal state of the assist systems for calculating the assist amount at the vehicle stopping or moving while decreasing the maximum assist amounts at the vehicle stopping and moving as the acquired temperature rises when the acquired temperature exceeds a predetermined temperature.

In this case, the assist control means may set the same amount to the maximum assist amounts at the vehicle stopping and moving, respectively only when the acquired temperature is lower than a predetermined temperature for judging if the maximum assist amount at the vehicle stopping should be decreased and in this case, in particular, the assist control means may determine the maximum assist amounts at the vehicle stopping and moving as the assist amount representing the upper limit of the assist force capable of being generated by the electric motor included in the assist system under the normal state.

Further, in this case, the predetermined temperature for judging if the maximum assist amount at the vehicle stopping should be decreased may be determined as a temperature lower than the predetermined temperature for judging if the maximum assist amount at the vehicle moving should be decreased and in this case, in particular, the predetermined temperature for judging if the maximum assist amount at the vehicle moving may be determined as a temperature judged that the acquired temperature cannot reach within a predetermined target time period by the manipulation of the steering wheel by the driver at the vehicle stopping on the basis of the balance of the heat generation amount and the heat radiation amount at a portion which generates heat due to the driving of the electric motor.

Thereby, the assist amount at the vehicle stopping or moving can be calculated under a state where the maximum assist amounts at the vehicle stopping and moving are appropriately decreased depending on the rising of the acquired temperature acquired by the detection or the estimation. Therefore, if the portion, which generates heat due to the driving of the electric motor, is likely to overheat, the influence of the overheating on the actuation of the assist system under the normal state can be prevented. Further, because the overheating can be prevented, it is not necessary to provide separate heat radiation means.

Further, only when the acquired temperature is lower than the predetermined temperature for judging if the maximum assist amount at the vehicle stopping should be decreased, the maximum assist amounts at the vehicle stopping and moving may be determined as the same amounts, respectively and in particular, may be determined as the assist amount which represents the upper limit of the assist force capable of being generated by the electric motor included in the assist system under the normal state. Thereby, for example, when the acquired temperature of the electric motor is lower than the predetermine temperature, a larger assist amount (a larger assist force) can be added to the steering wheel manipulation by the driver at the vehicle stopping. Thereby, the driver can extremely easily manipulate the steering wheel, for example, when the acquired temperature of the electric motor is low just after the driver starts carrying out the stationary steering. It should be noted that when the acquired temperature becomes higher than or equal to the predetermined temperature for judging if the maximum assist amount at the vehicle stopping should be decreased, the maximum assist amount is decreased to an amount smaller than the maximum assist amount at the vehicle moving as described above.

Further, the predetermined temperature for judging if the maximum assist amount at the vehicle stopping should be decreased may be determined as a temperature lower than the predetermined temperature for judging the maximum assist amount at the vehicle moving should be decreased, which predetermined temperature being judged that the acquired temperature cannot reach within a predetermined target time period on the basis of the balance of the heat generation and radiation amounts at a portion which generates heat due to the driving of the electric motor. Thereby, for example, even if the amount of the heat generated by the electric motor is likely to increase by the driver carrying out the stationary steering and thus, the acquired temperature is likely to rise, the acquired temperature cannot reach the predetermined temperature for judging if the maximum assist amount should be decreased.

Thereby, even if the driver starts moving the vehicle, the maximum assist amount at the vehicle moving is not decreased and thus, even when the driver manipulates the steering wheel just after the vehicle starts moving, an appropriate assist amount (an appropriate assist force) can be added by using the assist system under the normal state. Therefore, the driver is not likely to feel a discomfort due to a shortage of the assist amount (the assist force).

DESCRIPTION OF EMBODIMENTS a. First Embodiment

Figure 1:
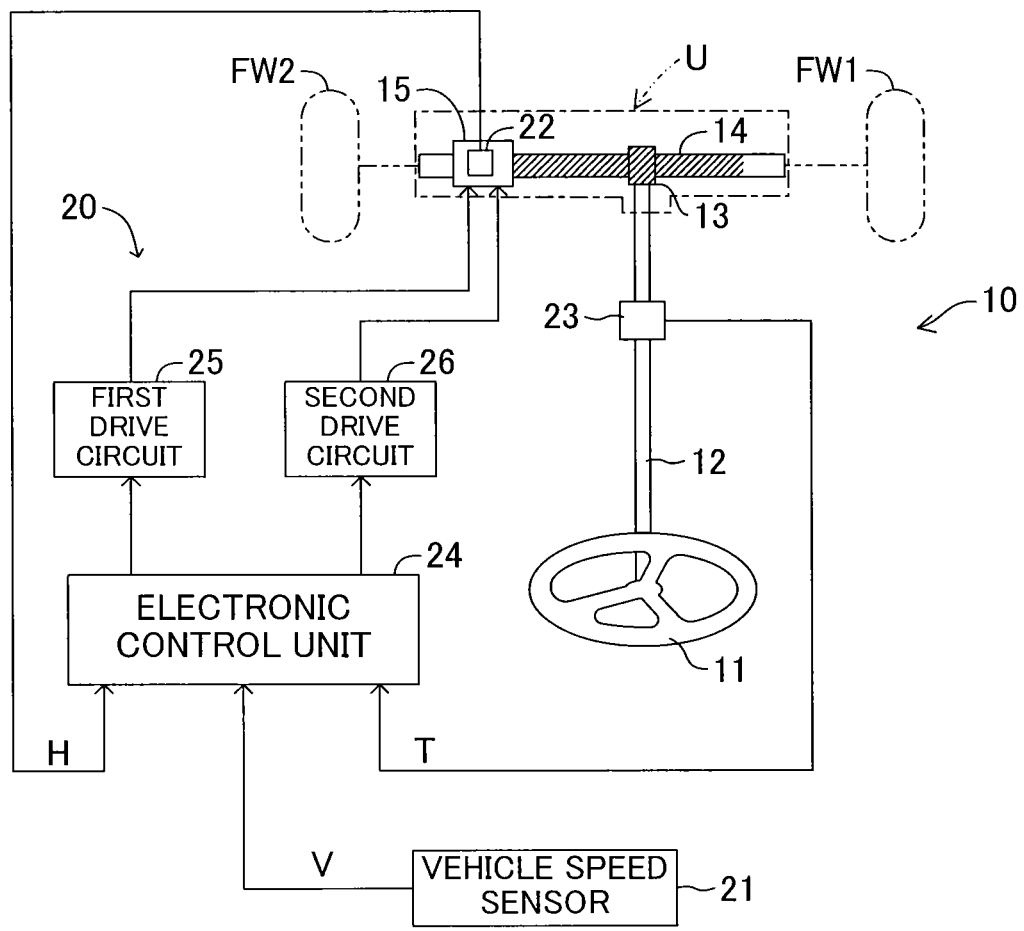
FIG. 1 is a schematic view showing a configuration of an electric power steering device which is common for embodiments of the invention.

Below, an electric power steering device for a vehicle according to embodiments of the invention will be described with reference to the drawings. FIG. 1 schematically shows the electric power steering device 10 which is common for the embodiments of the invention.

The electric power steering device 10 has a steering wheel 11 rotated by a driver in order to turn right and left front wheels FW1 and FW2 which are turning wheels, respectively. The steering wheel 11 is secured to a top end of a steering shaft 12 and is coupled to a turning gear unit U at the lower end of the steering shaft 12.

The turning gear unit U is, for example, a gear unit which employs a rack and pinion mechanism and is configured such that a rotation of a pinion gear 13 integrally connected to the lower end of the steering shaft 12 is transmitted to a rack bar 14. Further, the turning gear unit U includes an electric motor 15 (hereinafter, the electric motor will be referred to as "the EPS motor 15") for assisting manipulation force input to the steering wheel 11 by the driver, in particular, for assisting the rotation manipulation by reducing a turning torque input to the steering shaft 12 by the rotation manipulation of the steering wheel 11. According to this embodiment, an assist force (in particular, an assist torque) generated by the EPS motor 15 for reducing the manipulation force (the steering torque) is transmitted to the rack bar 14.

Figure 2:
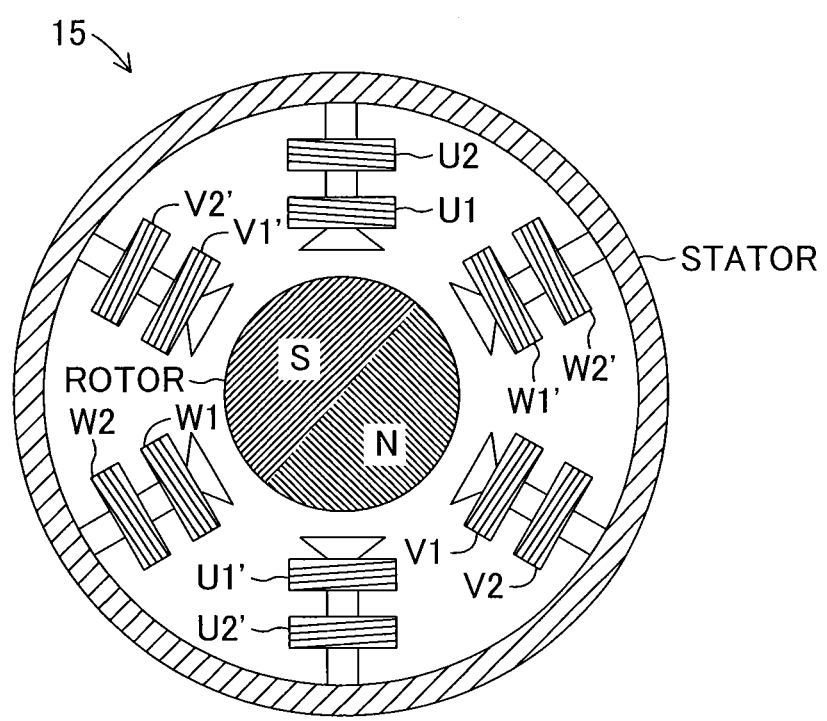
FIG. 2 is a schematic view showing a configuration of an EPS motor shown in FIG. 1.

The EPS motor 15, which is employed in the electric power steering device 10, is a three-phase DC brushless motor and is configured to be driven by a plurality of assist systems, in particular, in this embodiment, two assist systems. That is, as shown in FIG. 2, the EPS motor 15 according to this embodiment includes two wire winding groups, that is, a first group of wire windings U1, V1 and W1 (U1', V1' and W1') and a second group of wire windings U2, V2 and W2 (U2', V2' and W2'), which are provided on a stator housing a rotor which is made of permanent magnet. In the EPS motor 15, the first group of the wire windings U1, V1 and W1 (U1', V1' and W1') is connected to a first drive circuit 25 (an inverter circuit) of an electronic control circuit 20 described below and the second group of the wire windings U2, V2 and W2 (U2', V2' and W2') is connected to a second drive circuit 26 (an inverter circuit) of the electronic control circuit 20. Therefore, according to this embodiment, the assist systems including the EPS motor 15 corresponds to two assist systems formed by a first assist system including the first group of the wire windings U1, V1 and W1 (U1', V1' and W1') and the first drive circuit 25 and a second assist system including the second group of the wire windings U2, V2 and W2 (U2', V2' and W2') and the second drive circuit 26.

Next, the electric control device 20 for controlling the actuation of the EPS motor 15 described above will be described. As shown in FIG. 1, the electric control device 20 includes a vehicle speed sensor 21, a temperature sensor 22 and a steering torque sensor 23. The vehicle speed sensor 21 detects a vehicle speed V of the vehicle and outputs a signal corresponding to the detected vehicle speed V. It should be noted that the vehicle speed V may be acquired, for example, by a communication with the outside. The temperature sensor 22 is provided at a portion of the EPS motor 15, the temperature of which at least changes due to the actuation of the EPS motor 15 and according to the this embodiment, as shown in FIG. 1, the temperature sensor 22 is provided on the EPS motor 15 and detects a temperature H derived from the heat generated by the actuation of the EPS motor 15 and outputs a signal corresponding to the detected temperature H. It is possible to estimate and acquire the temperature H by using various physical amounts in place of detecting the temperature H directly.

The steering torque sensor 23 is coupled to the steering shaft 12 and detects the steering torque T input to the steering shaft 12 by the driver rotating the steering wheel 11 and outputs a signal corresponding to the detected steering torque T. It should be noted that the steering torque sensor 23 outputs the signal corresponding to the steering torque T as a positive value when the steering wheel 11 is rotated clockwise, while the steering torque sensor 23 outputs the signal corresponding to the steering torque T as a negative value when the steering wheel 11 is rotated counterclockwise.

According to this embodiment, two sets of resolver sensors are employed as the steering torque sensor 23. As is well-known, the resolver sensor includes a resolver rotor rotating along with a torsion bar and a resolver stator mounted on the vehicle body opposite to the resolver rotor and is configured such that a primary wire winding which is an excitation coil, is provided on one of the resolver rotor and the resolver stator and a pair of secondary wire windings which are detection coils, are provided on the other of the resolver rotor and the resolver stator, the secondary wire windings being positioned spaced apart by $\pi/2$ phase from each other. The secondary wire windings output SIN and COS phase signals as two kinds of inductive voltage signals corresponding to rotation angles, respectively by exciting the primary wire winding by the SIN phase signal. Therefore, the steering torque sensor 23 using the resolver sensors detects a rotation angle position every a predetermined detection cycle by acquiring an amplitude ratio between the SIN and COS phase signals and outputs a signal corresponding to the detected rotation angle position as a signal corresponding to the steering torque T.

Further, the electric control device 20 includes an electronic control unit 24 for controlling the actuation of the EPS motor 15. The electronic control unit 24 includes a microcomputer having a CPU, a ROM, a RAM, etc. as a main element part and controls the actuation of the EPS motor 15. To this end, at least, the sensors 21 to 23 described above are connected to the input side of the electronic control unit 24, respectively and the electronic control unit 24 controls the driving of the EPS motor 15 by using the detected values detected by the sensors 21 to 23, respectively as described below. On the other hand, the first and second drive circuits 25 and 26 for driving the EPS motor 15 are connected to the output side of the electronic control unit 24, respectively.

Figure 3:
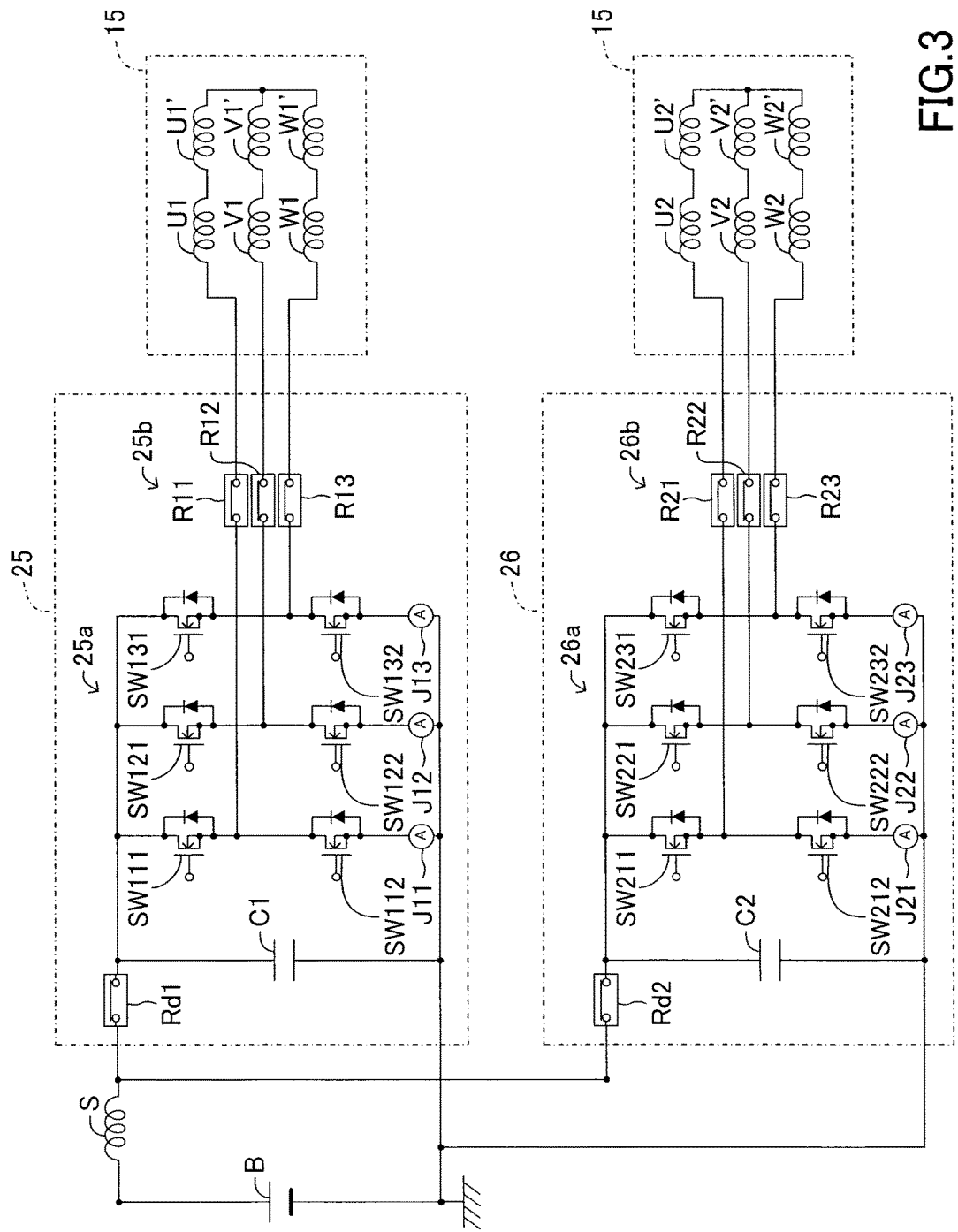
FIG. 3 is a circuit diagram schematically showing first and second drive circuits shown in FIG. 1.

As shown in FIG. 3, the first drive circuit 25 is configured by inverter and relay circuit parts 25a and 25b. The inverter circuit part 25a forms a three-phase inverter circuit for converting the direct current to the three-phase alternate current, the direct current being supplied from a battery (a power source) B and a smoothing reactor S via a power source relay Rd1 or from a capacitor C1. Further, the inverter circuit part 25a includes switching elements SW111, SW112, SW121, SW122, SW131 and SW132 corresponding to the wire windings U1, V1 and W1 (U1', V1' and W1') of the first wire winding group of the EPS motor 15, respectively, the wire windings U1, V1 and W1 (U1', V1' and W1') being connected by the star connection (the Y-connection).

The switching elements SW111, SW112, SW121, SW122, SW131 and SW132 are configured such that the switching elements SW111, SW121 and SW131 correspond to the High side (the high voltage side), respectively and correspond to three phases, that is, the U, V and W phrases of the EPS motor 15, respectively and the switching elements SW112, SW122 and SW132 correspond to the Lo side (the low voltage side), respectively and correspond to three phases, that is, the U, V and W phrases of the EPS motor 15, respectively and the switching elements SW111, SW112, SW121, SW122, SW131 and SW132 are formed, for example, from MOSFET. Further, current sensors (shunt resistances) J11, J12 and J13 for detecting the current flowing in the EPS motor 15, respectively are provided in the inverter circuit part 25a corresponding to the U, V and W phases, respectively.

As shown in FIG. 3, the relay circuit part 25b includes phase open relays R11, R12 and R13 corresponding to the U, V and W phases (in particular, the wire windings U1, V1 and W1 (U1', V1' and W1') of the first wire winding group) of the EPS motor 15. The relays R11, R12 and R13 are mechanical relays for allowing or shutting off the energization between the inverter circuit 25a and the U, V and W phases (in particular, the wire windings U1, V1 and W1 (U1', V1' and W1') of the first wire winding group) of the EPS motor 15, respectively. It should be noted that the relays R11, R12 and R13 are not limited to the mechanical relays and, for example, semiconductor relays can be employed.

As shown in FIG. 3, the second drive circuit 26 is configured by inverter and relay circuit parts 26a and 26b. The inverter circuit part 26a forms a three-phase inverter circuit for converting the direct current to the three-phase alternate current, the direct current being supplied from the battery (the power source) B and the smoothing reactor S via a power source relay Rd2 or from a capacitor C2. Further, the inverter circuit part 26a includes switching elements SW211, SW212, SW221, SW222, SW231 and SW232 corresponding to the wire windings U2, V2 and W2 (U2', V2' and W2') of the second wire winding group of the EPS motor 15, respectively, the wire windings U2, V2 and W2 (U2', V2' and W2') being connected by the star connection (the Y-connection), respectively.

The switching element SW211, SW212, SW221, SW222, SW231 and SW232 are configured such that the switching elements SW211, SW221 and SW231 correspond to the High side (the high voltage side), respectively and correspond to three phases, that is, the U, V and W phrases of the EPS motor 15, respectively and the switching elements SW212, SW222 and SW232 correspond to the Lo side (the low voltage side), respectively and correspond to three phases, that is, the U, V and W phrases of the EPS motor 15, respectively and the switching elements SW211, SW212, SW221, SW222, SW231 and SW232 are formed, for example, from MOSFET. Further, current sensors (shunt resistances) J21, J22 and J23 for detecting the current flowing in the EPS motor 15, respectively are provided in the inverter circuit part 26a corresponding to the U, V and W phases, respectively.

As shown in FIG. 3, the relay circuit part 26b includes phase open relays R21, R22 and R23 corresponding to the U, V and W phases (in particular, the wire windings U2, V2 and W2 (U2', V2' and W2') of the second wire winding group) of the EPS motor 15. The relays R21, R22 and R23 are mechanical relays for allowing or shutting off the energization between the inverter circuit 26a and the U, V and W phases (in particular, the wire windings U2, V2 and W2 (U2', V2' and W2') of the second wire winding group) of the EPS motor 15, respectively. It should be noted that the relays R21, R22 and R23 are not limited to the mechanical relays and, for example, semiconductor relays can be employed.

In the first and second drive circuits 25 and 26 configured as described above, the inverter circuit parts 25a and 26a are ON-OFF-controlled, respectively and the relay circuit parts 25b and 26b are switching-controlled, respectively by the signal from the electronic control unit 24. Thereby, for example, the electronic control unit 24 is configured to switch the states of the phase open relays R11, R12 and R13 of the relay circuit part 25b and the phase open relays R21, R22 and R23 of the relay circuit part 26b to a state for allowing the energization (a closed state), respectively and control the pulse widths of the switching elements SW111, SW112, SW121, SW122, SW131 and SW132 of the inverter circuit part 25a and the switching elements SW211, SW212, SW221, SW222, SW231 and SW232 of the inverter circuit part 26a, respectively (the PWM control) to supply the three-phase drive current from the battery B or the capacitors C1, C2 to the EPS motor 15.

On the other hand, the electronic control unit 24 is configured to switch any of the states of the phase open relays R11, R12 and R13 of the relay circuit part 25b and the states of the phase open relays R21, R22 and R23 of the relay circuit part 26b to a state for shutting out the energization (an open state), respectively to supply the drive current to the EPS motor 15 via the phase open relays which are under the closed state, other than the phase open relays which are switched to the open state. Further, the electronic control unit 24 is configured to control the states of the switching elements SW111, SW112, SW121, SW122, SW131 and SW132 of the inverter circuit part 25a and the switching elements SW211, SW212, SW221, SW222, SW231 and SW232 of the inverter circuit part 26a, respectively to the OFF state (the open state) so as not to supply the drive current to the EPS motor 15, independently of the switched states of the phase open relays R11, R12 and R13 of the relay circuit part 25b and the phase open relays R21, R22 and R23 of the relay circuit part 26b.

Figure 4:
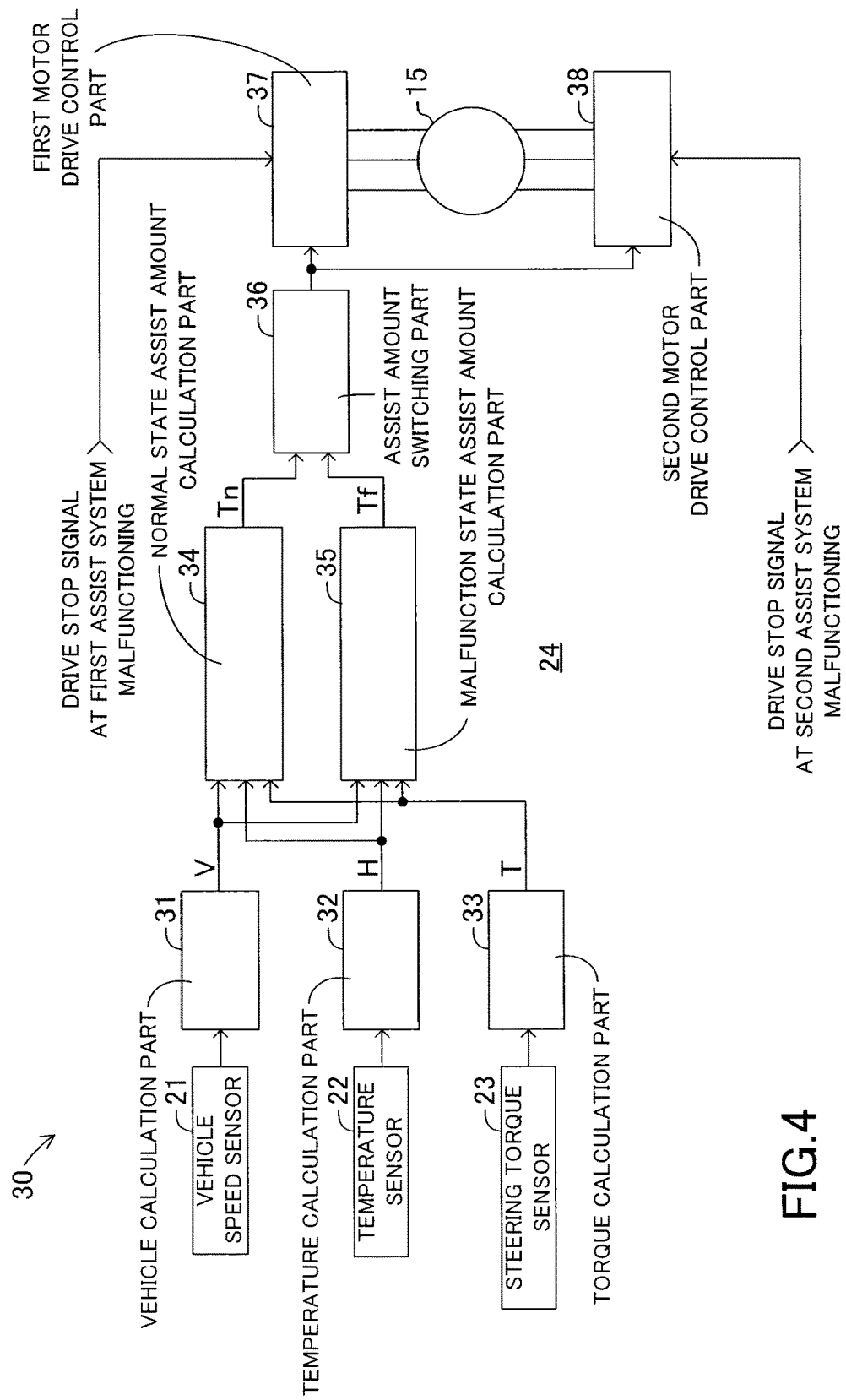
FIG. 4 is a functional block diagram functionally showing a computer program process (an assist control) according to each of the embodiments of the invention executed by an electronic control unit shown in FIG. 1.

Next, the actuation of the electric power steering device 10 configured as described above will be described. According to the electric power steering device 10, the EPS motor 15 is driven and controlled by the electric control device 20 (in particular, the electronic control unit 24) configured as described above to reduce the burden of the driver who rotates the steering wheel 11. Below, the control of driving the EPS motor 15 by the electric control device 20, that is, the assist control by the electric control device 20 will be described by using the functional block diagram of FIG. 4 showing functions realized by the computer program process in the electronic control unit 24.

The electronic control unit 24 adds an appropriate assist force (an appropriate assist torque) to the manipulation of rotating the steering wheel 11 by the driver with by controlling the drive of the EPS motor 15. The electronic control unit 24 continues to add the assist force (the assist torque) to the manipulation of rotating the steering wheel 11 by the driver by using the assist system under the normal state, which does not malfunction, even when a malfunction occurs in one of the first and second assist systems. To this end, as shown in FIG. 4, the electronic control unit 24 includes an assist control part 30 which calculates an assist amount representing an appropriate assist force (an appropriate assist torque) depending on whether a malfunction occurs in the first and second assist systems and controls the drive of the EPS motor 15.

The assist control part 30 includes a vehicle speed calculation part 31, a temperature calculation part 32 and a torque value calculation part 33. The vehicle speed calculation part 31 receives the signal corresponding to the vehicle speed V output from the vehicle speed sensor 21 and calculates the vehicle speed V. The temperature calculation part 32 receives the signal corresponding to the temperature H output from the temperature sensor 22 and calculates the temperature H. The torque value calculation part 33 receives the signal corresponding to the steering torque value T output from the steering torque sensor 23 and calculates the steering torque value T. The vehicle speed, temperature and torque value calculation parts 31, 32 and 33 output the calculated vehicle speed V, temperature H and steering torque value T, respectively to the normal and malfunction state assist amount calculation parts 34 and 35, respectively.

The normal state assist amount calculation part 34 calculates the assist amount Tn when no malfunction occurs in the first and second assist systems, in other words, when it is possible to normally drive the EPS motor 15 via the first and second assist systems. The normal state assist amount calculation part 34 calculates the assist amount Tn corresponding to the input steering torque value T by referring to a predetermined normal state assist amount map (the third quadrant is symmetrical about the origin) shown in FIG. 5 at least by using the vehicle speed V output from the vehicle speed calculation part 31 and the steering torque value T output from the torque value calculation part 33.

Figure 5:
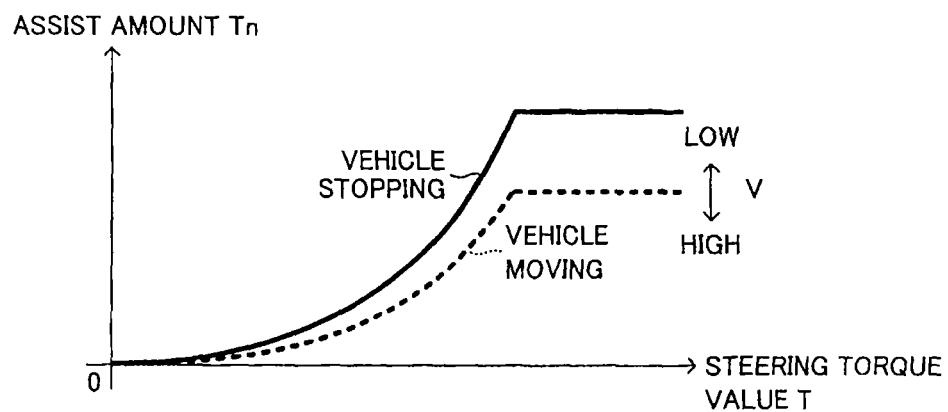
FIG. 5 is a graph showing a normal state assist map showing a relationship between a steering torque referred by a normal state assist amount calculation part shown in FIG. 4 and an assist amount according to the first embodiment of the invention.

It should be noted that the normal state assist amount map shown in FIG. 5 referred by the normal state assist amount calculation part 34 is prepared every typical vehicle speed V and is formed such that the assist amount Tn decreases as the vehicle speed V of the moving vehicle increases, while the assist amount Tn increases as the vehicle speed V of the moving vehicle decreases. Therefore, for example, a functional expression for calculating the normal state assist amount Tn on the basis of the steering torque value T and the vehicle speed V may be prepared and the normal state assist amount calculation part 34 may be configured to calculate the assist amount Tn by using the functional expression in place of calculating the assist amount Tn by referring to the normal state assist amount map shown in FIG. 5.

The electric power steering device 10 has a function for preventing the overheating of the EPS motor 15 and the first and second drive circuits 25 and 26 including various semiconductor elements, respectively. In particular, for example, the EPS motor 15 generates a larger amount of heat as the load to the generated assist force (the generated assist torque) increases, in other words, as the assist amount increases. Accordingly, normally, the maximum assist amount capable of being added by the EPS motor 15 is limited by a limit value which varies depending on the temperature. In this regard, the inverter circuit parts 25a and 26a of the first and second drive circuits 25 and 26 also generate heat and accordingly, the maximum assist amount added by the EPS motor 15 may be limited by a limit value which varies depending on the temperatures of the inverter circuit parts 25a and 26a in place of or in addition to the limit value which varies depending on the temperature of the EPS motor 15.

Figure 6:
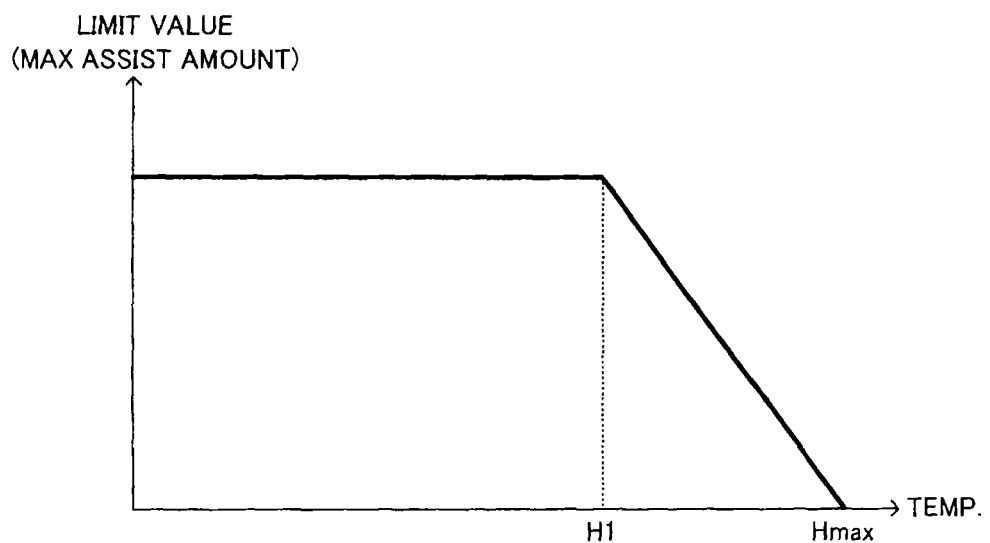
FIG. 6 is a graph showing a relationship between a temperature of the EPS motor and a limit value (a maximum assist amount) according to the first embodiment of the invention.

In detail, as shown in FIG. 6, the electric power steering device 10 has a function for preventing the overheating by gradually decreasing the limit value, that is, gradually decreasing the maximum assist amount as the temperature H (the acquired temperature H) of the EPS motor 15 detected (acquired) by the temperature sensor 22 and the temperature calculation part 32 increases after the temperature H exceeds a first predetermined temperature H1, which is set as a temperature lower than the upper limit temperature Hmax wherein the EPS motor 15 can be normally driven. Therefore, the normal state assist amount calculation part 34 calculates the assist amount Tn while the normal state assist amount calculation part 34 appropriately changes the limit value, that is, the maximum assist amount depending on the temperature H of the EPS motor 15 output from the temperature calculation part 32.

When a malfunction occurs in the first assist system (the second assist system), the electronic control unit 24 continues to execute the assist control by driving the EPS motor 15 using the second assist system (the first assist system). In this case, the EPS motor 15 is driven by one assist system (one system) for assisting the manipulation of rotating the steering wheel 11 by the driver and therefore, the torque capable of being generated by the EPS motor 15 is smaller than the torque generated by the EPS motor 15 which is driven by two systems under the normal state. Thus, in order to generate the assist amount Tn calculated by the normal state assist amount calculation part 34, the load to the EPS motor 15 becomes larger than the load to the EPS motor 15 under the normal state. As a result, the amount of the heat generated by the EPS motor 15 increases and thus, the temperature H is likely to exceed the first predetermined temperature H1 and therefore, the limit value, that is, the maximum assist amount is limited and thus, the torque capable of being generated by the EPS motor 15 further decreases.

In particular, for example, if the driver has carried out the stationary steering for long time to turn the right and left front turning wheels FW1 and FW2 at the vehicle stopping under a state where the EPS motor 15 is driven by one system, in other words, when a malfunction occurs as described above, the amount of the heat generated by the EPS motor 15 is large and thus, the temperature H may be not likely to becomes lower than the first predetermined temperature H1. Then, when the vehicle starts moving under the state described above, the maximum assist amount added by the EPS motor 15 is likely to be continued to be considerably limited and thus, the driver may feel a discomfort in the manipulation of rotating the steering wheel 11. Below, the discomfort felt by the driver will be described in detail with reference to FIG. 7.

Figure 7:
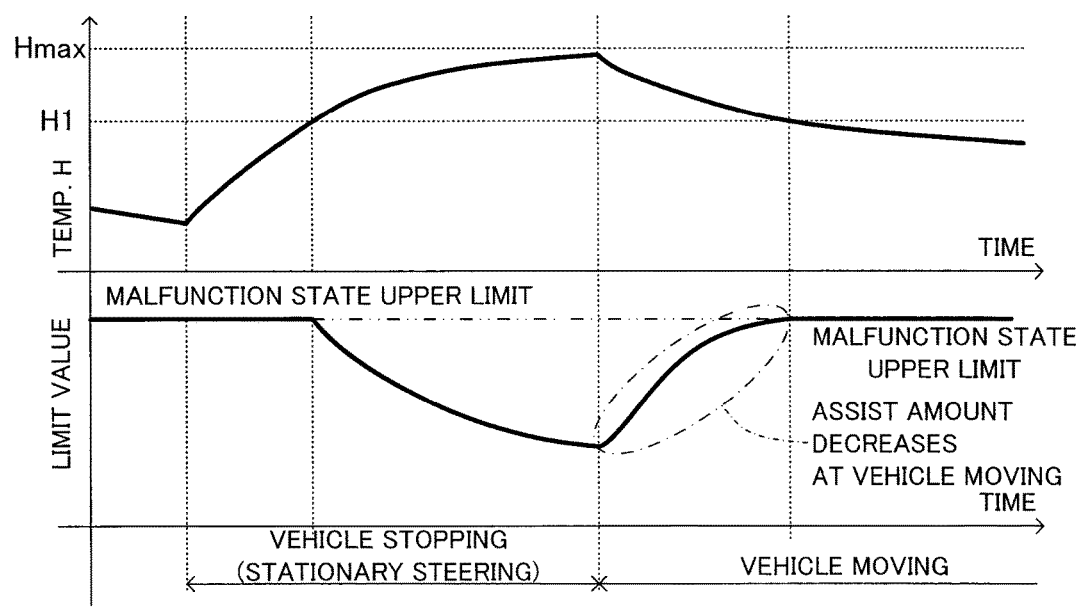
FIG. 7 is a time chart for describing a relationship between a change of the temperature of the EPS motor and a change (a decrease) of the limit value (the maximum assist amount) in terms of time under a state where the limit value (the maximum assist amount) at the vehicle stopping is equal to the limit value (the maximum assist amount) at the vehicle moving.

As in this embodiment, when the electric power steering device 10 includes the first and second assist systems and a malfunction occurs in one of the assist systems, the assist force, that is, the assist amount capable of being added by the EPS motor 15 may decrease, for example, to the half of the assist amount. Now, it is assumed that the malfunction state upper limit of the assist torque, that is, the limit value (the maximum assist amount) capable of being generated by the EPS motor 15 driven by the normal assist system is maintained constant, independently of whether the vehicle stops or moves when a malfunction occurs in one of the first and second assist systems as shown in FIG. 7. In this case, if the driver carries out the stationary steering at the vehicle stopping, for example, the assist amount Tn calculated by the normal state assist amount calculation part 34 may be larger than the malfunction state upper limit and therefore, the EPS motor 15 drives to continue to generate the assist amount (the assist force) corresponding to the malfunction state upper limit because the EPS motor 15 tries to add the assist amount Tn.

If the stationary steering is carried out at the vehicle stopped as described above, the load to the EPS motor 15 is large in order to add the assist amount (the assist force) corresponding to the malfunction state upper limit and therefore, as shown in FIG. 7, the temperature H rapidly rises to the first predetermined temperature H1. Then, when the temperature H exceeds the first predetermined temperature H1, the limit value, that is, the maximum assist amount is limited in response to the rising of the temperature H in order to prevent the EPS motor 15, etc. from overheating as described above. Therefore, when the driver continues to carry out the stationary steering at the vehicle stopping, the limit value, that is, the maximum assist amount decreases considerably as the temperature H of the EPS motor 15 rises. Then, under the circumstances, the driver needs to input a large steering torque T to the steering shaft 12 via the steering wheel 11 to turn the right and left front wheels FW1 and FW2 when the assist amount (the assist force) actually added by the EPS motor 15 decreases.

Then, when the vehicle starts moving under the state described above, the frictional resistance between the right and left front turning wheels FW1 and FW2 and the road decreases and therefore, the load to the EPS motor 15 decreases and as shown in FIG. 7, the temperature H of the EPS motor 15 starts decreasing by the moving wind generated by the moving of the vehicle. However, as shown in FIG. 7, immediately after the vehicle starts moving, the temperature H of the EPS motor 15 exceeds the first predetermined temperature H1 considerably as a result of the continuous stationary steering as described above and the limit value (the maximum assist amount) is limited considerably. That is, just after the vehicle starts moving after the driver carries out the stationary steering, the EPS motor 15 is limited to the small limit value (the small maximum assist amount) and therefore, the assist amount is insufficient and thus, the driver feels a heavier turning of the steering wheel 11, compared with the turning of the steering wheel 11 felt by the driver when the vehicle moves under the normal state and as a result, the driver feels a discomfort due to the difference in the turning feeling.

Accordingly, in particular, in order to reduce a discomfort likely to be felt by the driver when a malfunction occurs in one of the first and second assist systems, the malfunction state assist amount calculation part 35 calculates the assist amount Tf while decreasing the maximum assist amount which is the limit value at the vehicle stopping when a malfunction occurs, compared with the maximum assist amount which is the limit value (the malfunction state upper limit) at the vehicle moving when a malfunction occurs. Therefore, similar to the normal state assist amount calculation part 34, the malfunction state assist amount calculation part 35 calculates the assist amount Tf corresponding to the steering torque value T input by the driver by referring to a predetermined malfunction state assist amount map (the third quadrant is symmetrical about the origin) shown in FIG. 8 at least by using the vehicle speed V output from the vehicle speed calculation part 31 and the steering torque value T output from the torque value calculation part 33.

Figure 8:
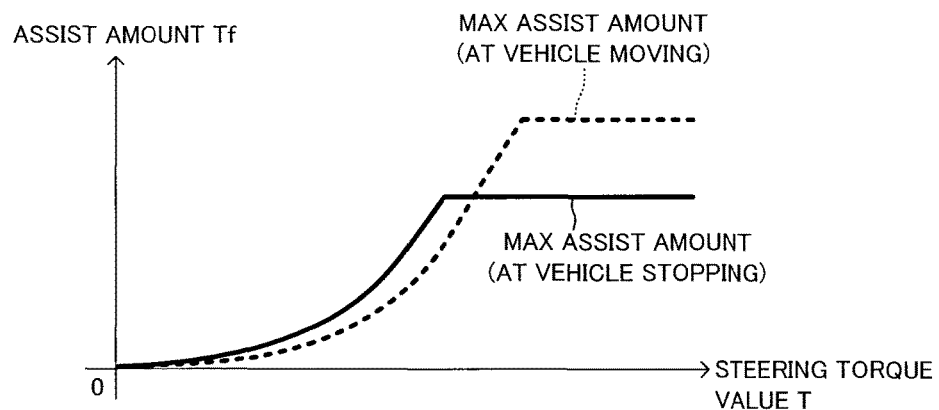
FIG. 8 is a graph showing a malfunction state assist amount map showing a relationship between a steering torque value referred by a malfunction state assist amount calculation part shown in FIG. 4 and the assist amount according to the first embodiment of the invention.

The malfunction state assist amount map is configured by the vehicle stopping state property for calculating the assist amount Tf at the vehicle stopping as shown by the solid line and the vehicle moving state property for calculating the assist amount Tf at the vehicle moving as shown by the broken line. As shown in FIG. 8, according to the malfunction state assist amount map, the maximum assist amount in the vehicle stopping state property is smaller than the maximum assist amount in vehicle moving state property (that is, the malfunction state upper limit) It should be noted that for example, the malfunction state assist amount calculation part 35 can judge if the vehicle stops by judging that the vehicle stops when the vehicle speed is "0" or smaller than or equal to an extremely low vehicle speed lower than a predetermined vehicle speed on the basis of the vehicle speed V output from the vehicle speed calculation part 31.

Further, similar to the normal state assist amount map, the malfunction state assist amount map shown in FIG. 8 may be prepared every typical vehicle speed V and may be prepared such that the assist amount Tf decreases as the vehicle speed V of the moving vehicle increases, while the assist amount Tf increases as the vehicle speed V of the moving vehicle decreases. Therefore, for example, a functional expression for calculating the assist amount Tf in the vehicle moving state property on the basis of the steering torque value T and the vehicle speed V may be prepared and the malfunction state assist amount calculation part 35 may be configured to calculate the assist amount Tf at the vehicle moving by using the functional expression in place of calculating the assist amount Tf at the vehicle moving by referring to the vehicle moving state property of the malfunction state assist amount map shown in FIG. 8.

As described above, a discomfort felt by the driver due to a shortage of the assist amount can be reduced by calculating the assist amount Tf on the basis of whether the vehicle stops or moves as described above even if a malfunction occurs in one of the first and second assist systems. Below, this will be described in detail with reference to FIG. 9. The malfunction state assist amount calculation part 35 appropriately changes the limit value depending on the temperature H of the EPS motor 15 output from the temperature calculation part 32 and calculates the assist amount Tf.

As described above, when a malfunction occurs in one of the first and second assist systems, the assist amount (the assist force) added (generated) by the EPS motor 15 becomes smaller than the assist amount added by the EPS motor 15 under the normal state where no malfunction occurs because the malfunction state upper limit decreases. In this regards, the malfunction state assist amount calculation part 35 calculates the assist amount Tf on the basis of the vehicle stopping state property which has been determined such that the limit value (the maximum assist amount) at the vehicle stopping is smaller than the malfunction state upper limit and on the other hand, the malfunction state assist amount calculation part 35 calculates the assist amount Tf on the basis of the vehicle moving state property which has been determined such that the limit value (the maximum assist amount) at the vehicle moving corresponds to the malfunction state upper limit. Therefore, the EPS motor 15 can add (generate) the assist amount Tf limited to an amount smaller than the malfunction state upper limit when the vehicle stops and on the other hand, the EPS motor 15 can add (generate) the assist amount Tf up to the malfunction state upper limit when the vehicle moves.

Figure 9:
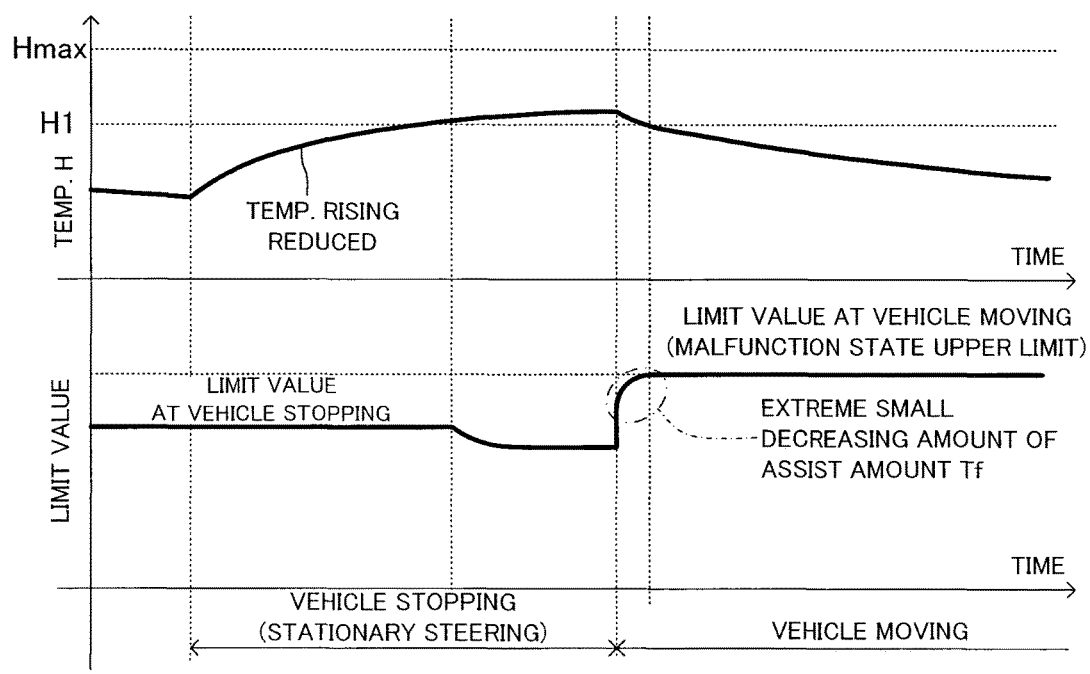
FIG. 9 is a time chart for describing a relationship between the change of the temperature of the EPS motor and the change (the decrease) of the limit value (the maximum assist amount) in terms of time under a state where the limit value (the maximum assist amount) during the stopping of the vehicle is smaller than the limit value (the maximum assist amount) at the vehicle moving according to the first embodiment of the invention.

Thereby, as shown in FIG. 9, when the driver carries out the stationary steering at the vehicle stopping, the limit value (the maximum assist amount) is limited to a value smaller than the malfunction state upper limit and therefore, the load to the EPS motor 15 is small in order to add (generate) the assist amount Tf. As a result, as shown in FIG. 9, the rising of the temperature H is reduced, compared with the case shown in FIG. 7 and therefore, even when the driver has carried out the stationary steering for a certain time, the temperature H is not likely to exceed the first predetermined temperature H1. That is, the overheating of the EPS motor 15, etc. can be effectively prevented. Further, because the rising of the temperature H is reduced, the decreasing of the limit value (the maximum assist amount) due to the rising of the temperature H can be reduced as shown in FIG. 9. It should be noted that under this state, the driver inputs the generally constant steering torque T to the steering shaft 12 via the steering wheel 11 to turn the right and left front wheels FW1 and FW2 while the driver carries out the stationary steering.

Then, when the vehicle starts moving under the state described above, the malfunction state assist amount calculation part 35 stops the calculation of the assist amount Tf on the basis of the vehicle stopping state property and starts the calculation of the assist amount Tf on the basis of the vehicle moving state property. Under this state, if the driver has carried out the stationary steering at the vehicle stopping, the temperature H of the EPS motor 15 may exceed the first predetermined temperature H1 as shown in FIG. 9. However, as described above, because the load to the EPS motor 15 is reduced and the generation of the heat is effectively prevented, the difference between the temperature H and the first predetermined temperature H1 can be decreased. As a result, as shown in FIG. 9, just after the vehicle starts moving after the driver carries out the stationary steering, the limit value (the maximum assist amount) in the vehicle moving state property is slightly limited, however, the decreasing of the assist amount Tf due to the limitation is extremely small and the temperature H promptly lowers to a temperature lower than the first predetermined temperature H1 after the vehicle starts moving and then, the limit value (the maximum assist amount) corresponds to the malfunction state upper limit. Therefore, the driver is not likely to feel a discomfort due to a shortage of the assist amount added by the EPS motor 15.

Again, referring to FIG. 4, the normal and malfunction state assist amount calculation parts 34 and 35 calculate the assist amounts Tn and Tf, respectively. Then, the normal and malfunction state assist amount calculation parts 34 and 35 output the calculated assist amounts Tn and Tf to the assist amount switching part 36.

The assist amount switching part 36 receives the assist amounts Tn and Tf calculated by the normal and malfunction state assist amount calculation parts 34 and 35. Then, when it is judged that no malfunction occurs in the first and second assist systems on the basis of the judgment result carried out by a well-known malfunction judgement function not shown, the assist amount switching part 36 supplies the assist amount Tn input from the normal state assist amount calculation part 34 to the first and second motor drive control parts 37 and 38, respectively. It should be noted that for example, the well-known malfunction judgment function is configured to judge if a malfunction occurs in the first and second assist systems on the basis of the current values of the wire windings U1, V1 and W1 of the first wire winding group detected by the ammeter J11, J12 and J13, respectively provided in the first drive circuit 25 and the current values of the wire windings U2, V2 and W2 of the second wire winding group detected by the ammeter J21, J22 and J23, respectively provided in the second drive circuit 26. On the other hand, when it is judged that a malfunction such as a disconnection, a fixing of the switching elements, etc. occurs in one of the first and second assist systems by the well-known malfunction judgement function, the assist amount switching part 36 supplies the assist amount Tf input from the malfunction state assist amount calculation part 35 to the first and second motor drive control parts 37 and 38, respectively.

The first and second motor drive control parts 37 and 38 receive the assist amount Tn or Tf supplied from the assist amount switching part 36, respectively. In addition, the first and second motor drive control parts 37 and 38 acquire first and second assist system malfunction state drive stop signals output, for example, from the well-known malfunction judgment function, respectively.

In particular, when the first motor drive control part 37 has not received the first assist system malfunction state drive stop signal, the first motor drive control part 37 maintains the phase open relays R11, R12 and R13 of the relay circuit part 25b of the first drive circuit 25 at the closed state, respectively and further, the first motor drive control part 37 PWM-controls the pulse widths of the switching elements SW111, SW112, SW121, SW122, SW131 and SW132 of the inverter circuit part 25a depending on the assist amount Tn or Tf supplied from the assist amount switching part 36, respectively. Thereby, the EPS motor 15 is driven by the current supplied at least via the first drive circuit 25. On the other hand, when the first motor drive control part 37 has received the first assist system malfunction state drive stop signal, the first motor drive control part 37 maintains the phase open relays R11, R12 and R13 of the relay circuit part 25b at the open state and further, controls the switching elements SW111, SW112, SW121, SW122, SW131 and SW132 of the inverter circuit part 25a to the OFF state (the open state), respectively. Thereby, no current is supplied to the EPS motor 15 via the first drive circuit 25, however, the EPS motor 15 is driven by the current supplied via the second drive circuit 26.

Furthermore, when the second motor drive control part 38 has not received the second assist system malfunction state drive stop signal, the second motor drive control part 38 maintains the phase open relays R21, R22 and R23 of the relay circuit part 26b of the second drive circuit 26 at the closed state, respectively and further, PWM-controls the pulse widths of the switching elements SW211, SW212, SW221, SW222, SW231 and SW232 of the inverter circuit part 26a depending on the assist amount Tn or Tf supplied from the assist amount switching part 36, respectively. Thereby, the EPS motor 15 is driven by the current supplied at least via the second drive circuit 26. On the other hand, when the second motor drive control part 38 has received the second assist system malfunction state drive stop signal, the second motor drive control part 38 maintains the phase open relays R21, R22 and R23 of the relay circuit part 26b at the open state and further, controls the switching elements SW211, SW212, SW221, SW222, SW231 and SW232 of the inverter circuit part 26a to the OFF state (the open state), respectively. Thereby, no current is supplied to the EPS motor 15 via the second drive circuit 26, however, the EPS motor 15 is driven by the current supplied via the first drive circuit 25.

As can be understood from the description above, according to this embodiment, in particular, the limit value (the maximum assist amount) is limited to a value smaller than the malfunction state upper limit at the vehicle stopping and therefore, the load to the EPS motor 15 is small in order to add (generate) the assist amount Tf. Therefore, the amount of the heat generated in the EPS motor 15 can be reduced and thus, the rising of the temperature H can be reduced and as a result, the decreasing of the limit value (the maximum assist amount) due to the rising of the temperature H can be reduced.

Then, when the vehicle starts moving, the limit value (the maximum assist amount) in the vehicle moving state property is limited, however, the amount of the decreasing of the assist amount Tf due to the limitation is extremely small and the temperature H promptly lowers to a temperature lower than the first predetermined temperature H1 after the vehicle starts moving and thus, the limit value (the maximum assist amount) can correspond to the malfunction state upper limit. Therefore, the driver is not likely to feel a discomfort due to the shortage (the change) of the assist amount added by the EPS motor 15. Further, the amount of the heat generated by the EPS motor 15 can be effectively reduced and thus, it is not necessary to provide separate heat radiation means.

b. First Modification of First Embodiment

According to the first embodiment, the normal state assist amount calculation part 34 refers to the normal state assist amount map shown in FIG. 5, while the malfunction state assist amount calculation part 35 refers to the malfunction state assist amount map shown in FIG. 8. Further, according to the first embodiment, the malfunction state assist amount map referred by the malfunction state assist amount calculation part 35 includes the vehicle stopping and moving state properties, in detail, the malfunction state assist amount map is prepared such that the maximum assist amount at the vehicle stopping is smaller than the maximum assist amount at the vehicle moving.

As described above, the vehicle stopping and moving state properties can be determined such that the maximum assist amount at the vehicle stopping is smaller than the maximum assist amount at the vehicle moving by determining the malfunction state assist amount map by using the normal state assist amount map. In detail, under the normal state where no malfunction occurs in the first and second assist systems, the normal state assist amount calculation part 34 refers to a normal state assist amount map (the third quadrant is symmetrical about the origin) in which the maximum assist amount at the vehicle stopping is larger than the maximum assist amount at the vehicle moving as shown by a thin solid line and a thin broken line in FIG. 10, respectively. On the other hand, under the malfunction state where a malfunction occurs in one of the first and second assist systems, the malfunction state assist amount calculation part 35 refers to a malfunction state assist amount map which includes assist properties obtained, respectively by decreasing the assist properties at the vehicle stopping and moving, respectively as a whole as shown by a thick solid line and a thick broken line in FIG. 10, respectively.

That is, the malfunction state assist amount calculation part 35 refers to the malfunction state assist amount map in which the maximum assist amount at the vehicle stopping is smaller than the maximum assist amount at the vehicle moving (the malfunction state upper limit), contrary to the assist property under the normal state. As described above, even when the malfunction state assist amount calculation part 35 refers to the malfunction state assist amount map which includes the assist properties obtained by decreasing the assist properties of the normal state assist amount map as a whole, an advantage similar to the advantage of the first embodiment can be obtained and in addition, the data volume of the assist amount map previously memorized can be reduced and therefore, for example, the memory capacity of the semiconductor memory, etc can be reduced and thus, the cost of the electric power steering device 10 can be reduced.

c. Second Modification of First Embodiment

Figure 10:
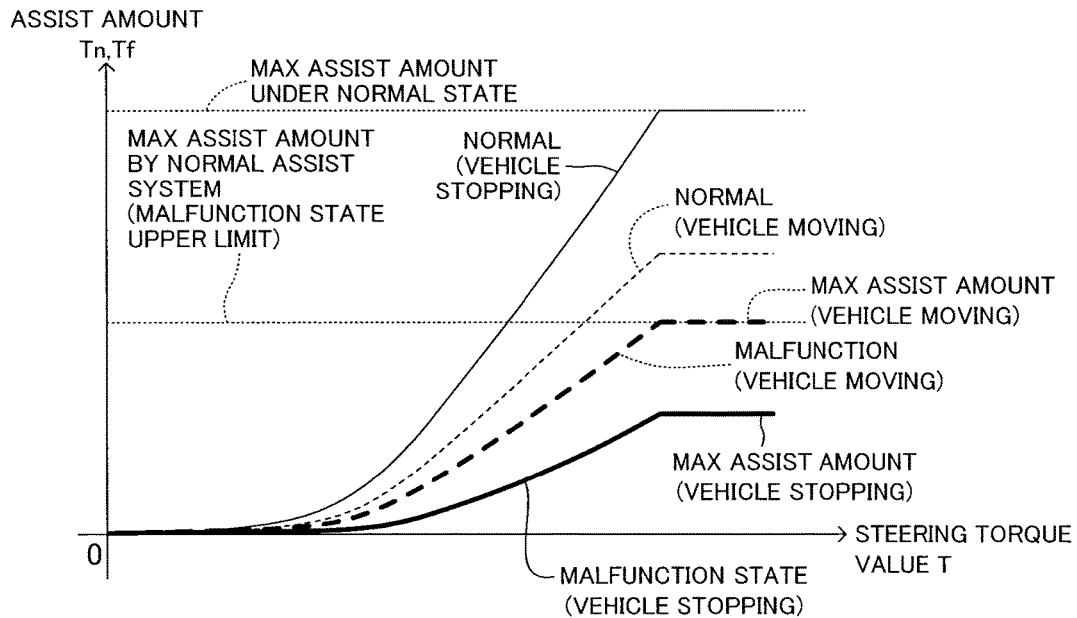
FIG. 10 is a graph showing an assist amount map showing a relationship between the steering torque value referred by the normal and malfunction state assist amount calculation parts shown in FIG. 4 and the assist amount according to the first modification of the first embodiment of the invention.

According to the first embodiment, as shown in FIGS. 5 and 8, the normal and malfunction state assist amount calculation parts 34 and 35 refer to the assist amount maps, respectively which are prepared separately. Further, according to the first modification of the first embodiment, as shown in FIG. 10, the malfunction state assist amount calculation part 35 refers to the malfunction state assist amount map which includes the assist properties obtained by decreasing the assist properties at the vehicle stopping and moving of the normal state assist amount map as a whole, respectively referred by the normal state assist amount calculation part 34.

In these cases, the normal and malfunction state assist properties at the vehicle stopping and moving in which the assist amount (the maximum assist amount) changes depending on the increasing and decreasing of the steering torque value T, are separately prepared. In this case, when the driver rotates the steering wheel 11, the driver is likely to feel a discomfort derived from the difference in the assist amount and the steering feeling between the normal state where no malfunction occurs in the first and second assist systems and the malfunction state where a malfunction occurs in one of the first and second assist systems.

Figure 11:
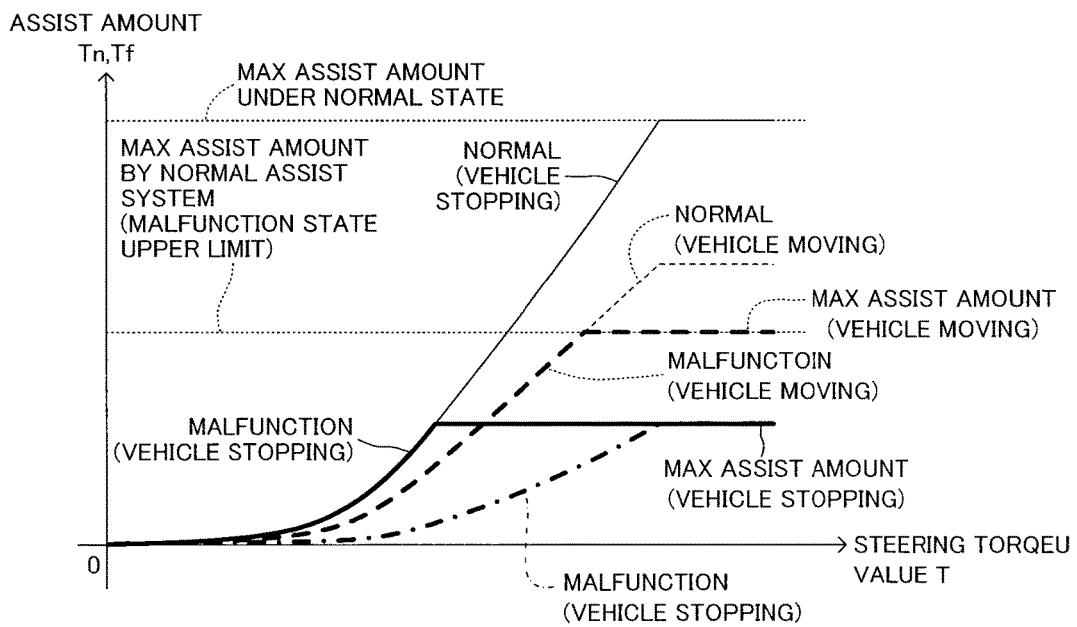
FIG. 11 is a graph showing an assist amount map showing a relationship between the steering torque value referred by the normal and malfunction state assist amount calculation parts shown in FIG. 4 and the assist amount according to the second modification of the first embodiment of the invention.

Therefore, as shown in FIG. 11, for example, the assist property under the normal state (the third quadrant is symmetrical about the origin) is used as a base, the malfunction state assist properties may be prepared such that the assist property (the assist amount) under the malfunction state at the vehicle stopping may correspond to the property (the assist amount) under the normal state at the vehicle stopping until the assist amount reaches the maximum assist amount under the malfunction state at the vehicle stopping and the assist property (the assist amount) under the malfunction state at the vehicle moving may correspond to the assist property (the assist amount) under the normal state at the vehicle moving until the assist amount reaches the maximum assist amount under the malfunction state at the vehicle moving. That is, when a malfunction occurs in one of the first and second assist systems, the malfunction state assist amount calculation part 35 may determine the limit value (the maximum assist amount) depending on whether the vehicle moves or stops and may saturate the assist property (the assist amount) under the normal state by the determined limit value (the maximum assist amount). However, in this case, if the stationary steering is carried out at the vehicle stopping, the load to the EPS motor 15 increases and accordingly, as shown by the dash line in FIG. 11, only the assist property at the vehicle stopping may be decreased.

As described above, a part of the assist property under the malfunction state corresponds to the assist property under the normal state and thereby, a discomfort felt by the driver due to the difference in the steering feeling between the normal and malfunction states can be appropriately reduced. The other advantages of the second modification is expected to be similar to the advantages of the first embodiment and the first modification.

d. Second Embodiment

According to the first embodiment and the modifications, the malfunction state assist amount calculation part 35 calculates the assist amount Tf according to the malfunction state assist amount map in which the limit value (the maximum assist amount) at the vehicle stopping is smaller than the limit value (the maximum assist amount) at the vehicle moving and the assist amount switching part 36 outputs the assist amount Tf calculated by the malfunction state assist amount calculation part 35 when a malfunction occurs in one of the first and second assist systems. That is, according to the first embodiment and the modifications, when a malfunction occurs in one of the first and second assist systems, if the vehicle stops, the assist amount Tf is calculated such that the limit value (the maximum assist amount) is always smaller than the limit value (the maximum assist amount) at the vehicle moving and then, the EPS motor 15 adds the calculated assist amount Tf to the manipulation of rotating the steering wheel 11 by the driver.

As described above, when the vehicle stops and thus, the load to the EPS motor 15 increases, the limit value (the maximum assist value) is limited to a small value and thereby, even when a malfunction occurs in one of the first and second assist systems, the amount of the heat generated by the EPS motor 15 can be reduced and thus, the rising of the temperature H can be appropriately reduced and as a result, the limitation to the limit value (the maximum assist amount) derived from the rising of the temperature H can be decreased. Therefore, for example, when the vehicle starts moving after the stationary steering, etc. is carried out, even if the driver rotates the steering wheel 11, the limitation to the limit value (the maximum assist amount) is small, in other words, the amount of the decreasing of the assist amount Tf is small and therefore, a discomfort felt by the driver in terms of the steering feeling can be appropriately reduced.

As shown in FIG. 7, when a malfunction occurs in one of the first and second assist systems, in particular, when the temperature of the EPS motor 15 is high due to the assist control for the stationary steering at the vehicle stopping, the limit value (the maximum assist amount) is limited considerably and a discomfort felt by the driver immediately after the vehicle starts moving is derived from the considerable limitation of the limit value (the maximum assist amount). On the other hand, when the load to the EPS motor 15 is small and the temperature of the EPS motor 15 is relatively low, if the limit value (the maximum assist amount) at the vehicle stopping corresponds to the malfunction state upper limit, that is, corresponds to the limit value (the maximum assist amount) at the vehicle moving and the assist amount Tf is calculated, the driver does not feel a discomfort.

Further, when the limit value (the maximum assist amount) at the vehicle stopping corresponds to the malfunction state upper limit as described above, the EPS motor 15 can add the large assist amount (the assist force), for example, at the initial stage before the amount of the heat generated by the EPS motor 15 increases due to the assist control to the manipulation of rotating the steering wheel 11 by the driver and thereby, the driver can feel a comfortable steering similar to the comfortable steering in the normal state. Below, this second embodiment will be described in detail, however, the same elements as the elements of the first embodiment are indicated by the same reference symbols and therefore, the detailed descriptions thereof will be omitted.

Figure 12:
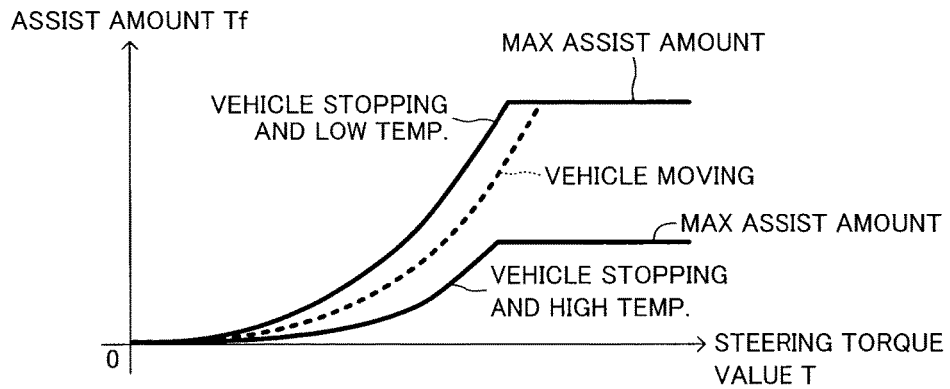
FIG. 12 is a graph showing a malfunction state assist amount map showing a relationship between the steering torque value referred by the malfunction state assist amount calculation part shown in FIG. 4 and the assist amount according to the second embodiment of the invention.

The malfunction state assist amount calculation part 35 according to the second embodiment calculates the assist amount Tf depending on the steering torque value T input by the driver by referring to the malfunction state assist amount map (the third quadrant is symmetrical about the origin) shown in FIG. 12. That is, according to the second embodiment, as shown in FIG. 12, according to the malfunction state assist amount map referred by the malfunction state assist amount calculation part 35, when the vehicle stops and the temperature H (the acquired temperature H) of the EPS motor 15 is low, the limit values (the maximum assist amount) in the vehicle stopping state property shown by the solid line and in the vehicle moving state property shown by the broken line correspond to the malfunction state upper limit. On the other hand, according to the malfunction state assist amount map, when the vehicle stops and the temperature H (the acquired temperature H) of the EPS motor 15 is high, the limit value (the maximum assist amount) in the vehicle stopping state property is smaller than the limit value (the maximum assist amount) in the vehicle moving state property, for example, is smaller than the malfunction state upper limit similar to the first embodiment.

The limit values (the maximum assist amount) in the vehicle stopping and moving properties of the malfunction state assist amount map according to the second embodiment will be described in detail with reference to FIG. 13. Similar to the first embodiment, the limit value (the maximum assist amount) capable of being added by the EPS motor 15 is limited depending on the temperature H (the acquired temperature H).

Figure 13:
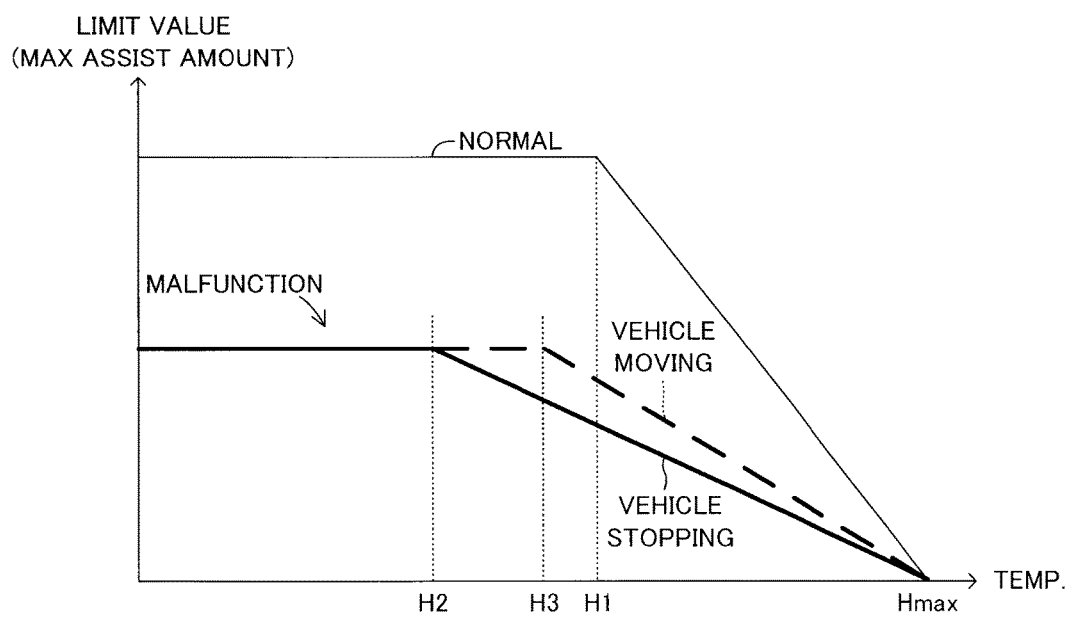
FIG. 13 is a graph showing a relationship between the temperature of the EPS motor and the limit value (the maximum assist amount) according to the second embodiment of the invention.

In particular, as shown in FIG. 13, under the normal state where no malfunction occurs in the first and second assist systems, when the temperature H of the EPS motor 15 detected by the temperature sensor 22 and the temperature calculation part 32 exceeds the first predetermined temperature H1 which is set to a temperature lower than the upper limit temperature Hmax similar to the first embodiment, the limit value (the maximum assist amount) gradually decreases. Therefore, also according to the second embodiment, the normal state assist amount calculation part 34 appropriately changes the limit value, that is, the maximum assist amount depending on the temperature H of the EPS motor 15 output from the temperature calculation part 32 and calculates the assist amount Tn.

On the other hand, under the malfunction state where a malfunction occurs in one of the first and second assist systems, when the temperature H (the acquired temperature H) detected (acquired) by the sensor 22 and the temperature calculation part 32, respectively is lower than or equal to a second predetermined temperature H2 which is lower than the first predetermined temperature H1, the same values (in particular, the malfunction state upper limit) are set as the limit values (the maximum assist amounts) in the vehicle stopping and moving state properties, respectively. That is, when the vehicle stops and the temperature H of the EPS motor 15 is low, the limit value (the maximum assist amount) in the vehicle stopping state property corresponds to the malfunction state upper limit.

When the temperature H of the EPS motor 15 exceeds the second predetermined temperature H2 at the vehicle stopping, in other words, when the temperature of the EPS motor 15 is high at the vehicle stopping, the limit value (the maximum assist amount) is gradually decreased. Further, when the temperature H of the EPS motor 15 is higher than the second predetermined temperature H2 and exceeds a third predetermined temperature H3 which is lower than or equal to the first predetermined temperature H1 at the vehicle moving, the limit value (the maximum assist amount) is gradually decreased.

As described above, the malfunction state assist amount calculation part 35 calculates the assist amount Tf depending on whether the vehicle stops or moves and the temperature H of the EPS motor 15 and thus, similar to the first embodiment, even if a malfunction occurs in one of the first and second assist systems, a discomfort due to a shortage of the assist amount felt by the driver can be reduced. Below, this will be described in detail with reference to FIG. 14 and for facilitating the understanding, will be described using an example case that the third predetermined temperature H3 corresponds to the first predetermined temperature H1. It should be noted that the third predetermined temperature H3 set in the following description is a temperature which the temperature H cannot reach within a target time period because the heat generation amount and the heat radiation amount at the EPS motor 15 are balanced to each other, for example, when the EPS motor 15 is subject to the load such as the stationary steering.

Figure 14:
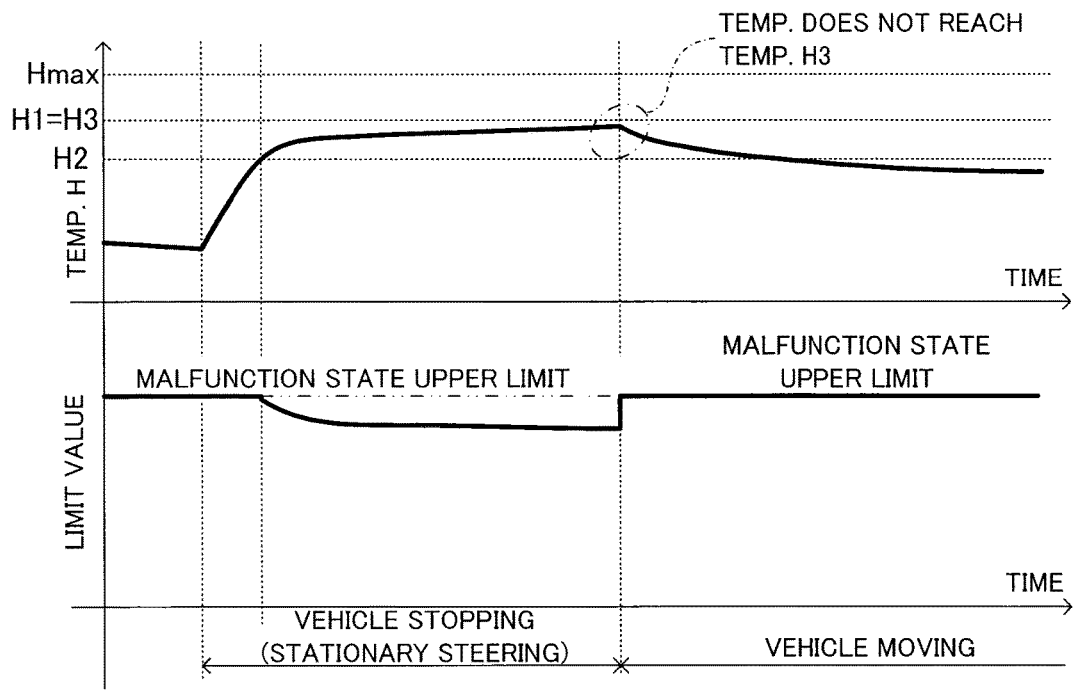
FIG. 14 is a time chart for describing a relationship between the change of the temperature of the EPS motor and the change (the decrease) of the limit value (the maximum assist amount) in terms of time under a state where the limit value (the maximum assist amount) during the stopping of a vehicle is equal to the limit value (the maximum assist amount) at the vehicle moving according to the second embodiment.

According to the second embodiment, when the temperature H of the EPS motor 15 is lower than or equal to the second predetermined temperature H2, the limit value (the maximum assist amount) in the malfunction state assist amount map corresponds to the malfunction state upper limit even if the vehicle stops. Thus, the malfunction state assist amount calculation part 35 can calculate the assist amount Tf by referring to the malfunction state assist amount map. Therefore, when the driver carries out the stationary steering at the vehicle stopping, as shown in FIG. 14, a large assist amount Tf (the assist force) is added to the manipulation of rotating the steering wheel 11 by the driver until the temperature H of the EPS motor 15 exceeds the second predetermined temperature H2.

Then, when the temperature H of the EPS motor 15 rises due to the addition of the assist amount Tf (the assist force) and exceeds the second predetermined temperature H2, similar to the first embodiment, the malfunction state assist amount calculation part 35 calculates the assist amount Tf (the assist force) by referring to the malfunction state assist amount map in which the limit value (the maximum assist amount) is limited so as to be lower than the malfunction state upper limit and thus, the load to the EPS motor 15 for adding (generating) the assist amount Tf is reduced. As a result, as shown in FIG. 14, the rising of the temperature H is reduced and thus, even if the stationary steering has been carried out for a certain time period, the temperature H does not reach the third predetermined temperature H3 (the first predetermined temperature H1). That is, the overheating of the EPS motor 15, etc. can be prevented. Further, the rising of the temperature H is reduced and thus, similar to the first embodiment, the decreasing of the limit value (the maximum assist amount) depending on the rising of the temperature H can be reduced.

From this condition, when the vehicle starts moving, similar to the first embodiment, the malfunction state assist amount calculation part 35 stops calculating the assist amount Tf on the basis of the vehicle stopping state property and starts calculating the assist amount Tf on the basis of the vehicle moving state property. If the stationary steering is continued to be carried out at the vehicle stopping, as shown in FIG. 14, the load to the EPS motor 15 is reduced and the heat generation is effectively reduced such that the temperature H of the EPS motor 15 does not exceed the third predetermined temperature H3. As a result, immediately after the vehicle starts moving after the driver carries out the stationary steering, as shown in FIG. 14, the decreasing amount of the assist amount Tf by the limitation at the vehicle stopping is extremely small and the limit value (the maximum assist amount) in the vehicle moving state property promptly corresponds to the malfunction state upper limit. Therefore, the driver is not likely to feel a discomfort due to a shortage of the assist amount added by the EPS motor 15.

As can be understood from the above description, according to the second embodiment, only when the temperature H (the acquired temperature H) is lower than the second predetermined temperature H2, the limit value (the maximum assist amount) in the malfunction state assist amount map corresponds to the malfunction state upper limit even if the vehicle stops. Thereby, when the temperature H of the EPS motor 15 is lower than the second predetermined temperature H2, a large assist amount is added to the manipulation of rotating the steering wheel 11 by the driver. Thereby, the driver can rotate the steering wheel 11 extremely easily.

Further, the load to the EPS motor 15 can be reduced to effectively reduce the heat generation such that the temperature H of the EPS motor 15 does not exceed the third predetermined temperature H3 and thus, it is possible to make the limit value (the maximum assist amount) in the vehicle moving state property correspond to the malfunction state upper limit promptly. Therefore, the driver is not likely to feel a discomfort due to a shortage of the assist amount added by the EPS motor 15. The other advantages are similar to the advantages of the first embodiment.

e. Modification of Second Embodiment

According to the second embodiment, as shown in FIG. 12, the malfunction state assist amount calculation part 35 is configured such that the assist properties in which the assist amount (the maximum assist amount) changes depending on the increasing and decreasing of the steering torque value T are determined separately when the temperature of the EPS motor 15 is low and high, respectively. In this case, for example, the driver may feel a discomfort due to the difference in the added assist amount Tf under a state where the driver rotate the steering wheel 11 to continues to carry out the stationary steering.

Figure 15:
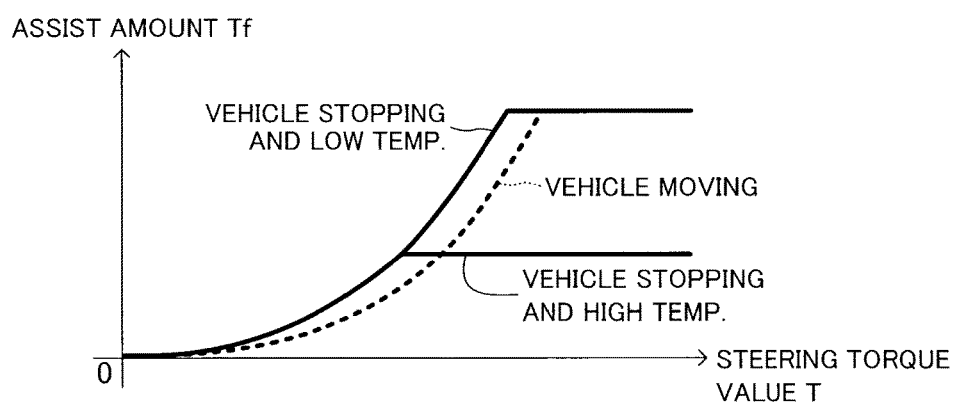
FIG. 15 is a graph showing an assist amount map showing a relationship between the steering torque value referred by the malfunction state assist amount calculation part shown in FIG. 4 and the assist amount according to the modification of the second embodiment of the invention.

Therefore, as shown in FIG. 15, the vehicle stopping state assist property at the low temperature (the third quadrant is symmetrical about the origin) is employed as a base and the assist property (the assist amount) at the high temperature of the EPS motor 15 may be configured to correspond to the assist property (the assist amount) at the low temperature until the assist amount reaches the maximum assist amount. That is, when the temperature H of the EPS motor 15 exceeds the second predetermined temperature H2 to the high temperature at the vehicle stopping, the malfunction state assist amount calculation part 35 may determine the limit value (the maximum assist amount) depending on the temperature H and may saturate the assist property (the assist amount) at the vehicle stopping and the low temperature by the determined limit value (the maximum assist amount).

As described above, when a part of the assist property at the vehicle stopping and high temperature state corresponds to the assist property at the vehicle stopping and low temperature state, a discomfort of the steering feeling realized by the driver due to the difference in the steering feeling between the low and high temperature states can be reduced. The other advantages can be expected to be similar to the advantages of the second embodiment.

f. Other Modification

According to the first embodiment, the modifications thereof, the second embodiment and the modifications thereof, the normal and malfunction state assist amount calculation parts 34 and 35 is configured to refer the predetermined normal and malfunction state assist amount maps, respectively and calculate the assist amounts Tn and Tf on the basis of the assist amount maps, respectively. Further, the malfunction state assist amount calculation part 35 is configured to calculate the assist amount Tf on the basis of the vehicle stopping state property determined such that the limit value (the maximum assist amount) is smaller than the malfunction state upper limit when the vehicle stops and calculate the assist amount Tf on the basis of the vehicle moving state property determined such that the limit value (the maximum assist amount) corresponds to the malfunction state upper limit when the vehicle moves. Furthermore, the normal and malfunction state assist amount calculation parts 34 and 35 are configured to change the limit value (the maximum assist amount) depending on the temperature H of the EPS motor 15.

In this case, for example, the limit value (the maximum assist amount) determined depending on whether a malfunction occurs in any of the first and second assist systems, or whether the vehicle stops or moves, or whether the temperature H of the EPS motor 15 exceeds the first predetermined temperature H1 (the third predetermined temperature H3) or the second predetermined temperature H2, may be applied to the assist amount Tn calculated by the normal state assist amount calculation part 34 described above and the assist amounts Tn and Tf may be calculated conclusively. Below, this modification will be described in detail, however, the same elements as the elements according to the embodiments and modifications described above are indicated by the same reference symbols and thus, the descriptions thereof will be omitted.

Figure 16:
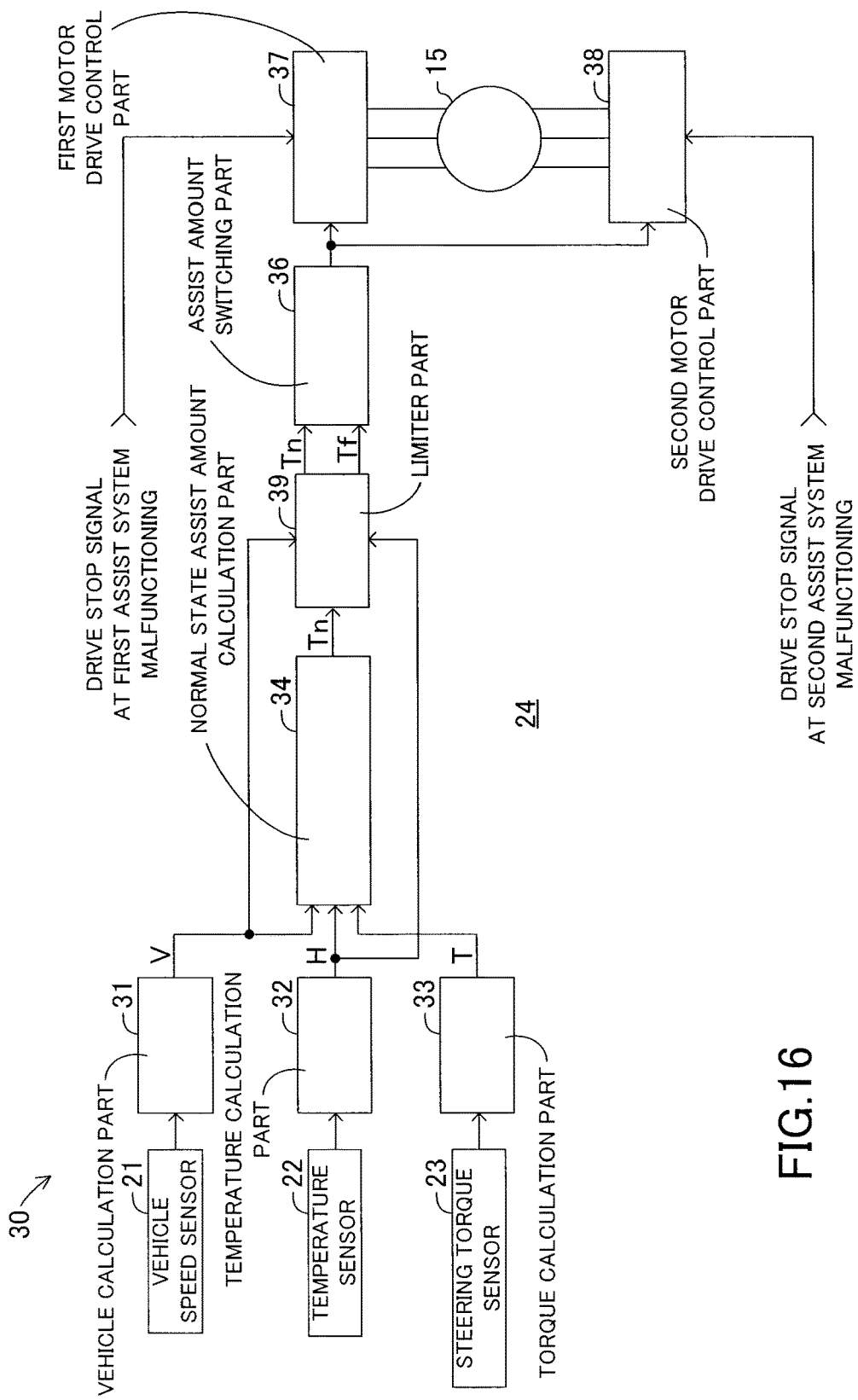
FIG. 16 is a functional block diagram functionally showing the computer program process (the assist control) according to the modification of the invention executed by an electronic control unit shown in FIG. 1.

According to this modification, the assist control part 30 is modified as shown in FIG. 16. That is, the assist control part 30 according to this modification is the same as the assist control part 30 shown in FIG. 4 according to the embodiments and modifications described above except that the malfunction state assist amount calculation part 35 is omitted and a limiter part 39 is provided.

The limiter part 39 is configured to calculate the limit value (the maximum assist amount) added to the assist amount Tn received from the normal state assist amount calculation part 34. Therefore, the limiter part 39 is configured to receive the vehicle speed V and the temperature H of the EPS motor 15 from the vehicle speed calculation part 31 and the temperature calculation part 32, respectively. Then, the limiter part 39 calculates the assist amount Tn or Tf on the basis of the vehicle speed V received from the vehicle speed calculation part 31 and the judgment result of the well-known malfunction judgment function. Further, the limiter part 39 calculates the assist amount Tn or Tf on the basis of the vehicle speed V received from the vehicle speed calculation part 31, the temperature H of the EPS motor 15 received from the temperature calculation part 32 and the judgment result of the well-known malfunction judgment function.

Figure 17:
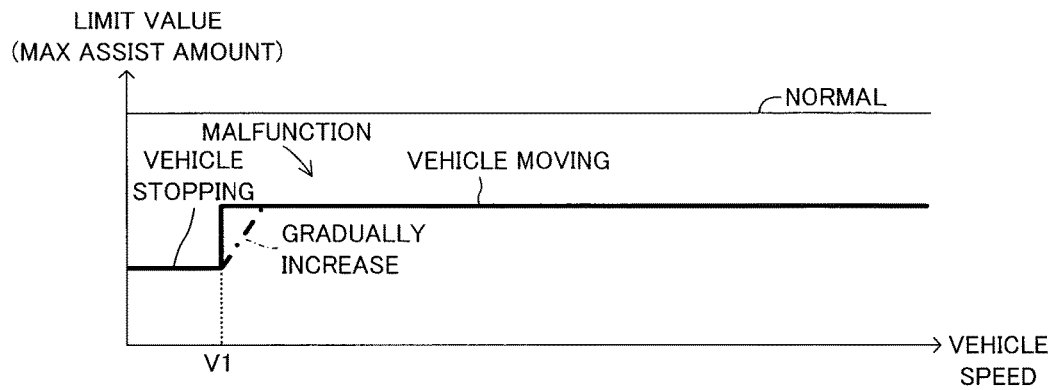
FIG. 17 is a graph showing a relationship between a vehicle speed referred by a limiter part shown in FIG. 16 and the limit value (the maximum assist amount).

In detail, for example, as shown in FIG. 17, the limiter part 39 determines the limit value (the maximum assist amount) such that the EPS motor 15 can generate the torque up to the maximum torque independently of whether the vehicle stops or moves when it is judged that it is under the normal state where no malfunction occurs in the first and second assist systems on the basis of the judgment result of the malfunction judgment function. That is, in this case, the limiter part 39 supplies the assist amount Tn received from the normal state assist amount calculation part 34 to the assist amount switching part 36 directly.

On the other hand, as shown in FIG. 17, when it is judged that it is under the malfunction state where a malfunction occurs in one of the first and second assist systems on the basis of the judgment result of the malfunction judgment function, the limiter part 39 determines the limit value (the maximum assist amount) such that the limit value when the vehicle stops at a vehicle speed lower than the vehicle speed V1, is smaller than the limit value when the vehicle moves at a vehicle speed higher than or equal to the vehicle speed V1. That is, in this case, the limiter part 39 calculates the assist amount Tf which corresponds to an assist amount obtained by adding the determined limit value (the maximum assist amount) to the assist amount Tn received from the normal state assist amount calculation part 34 and supplies the assist amount Tf to the assist amount switching part 36.

Figure 18:
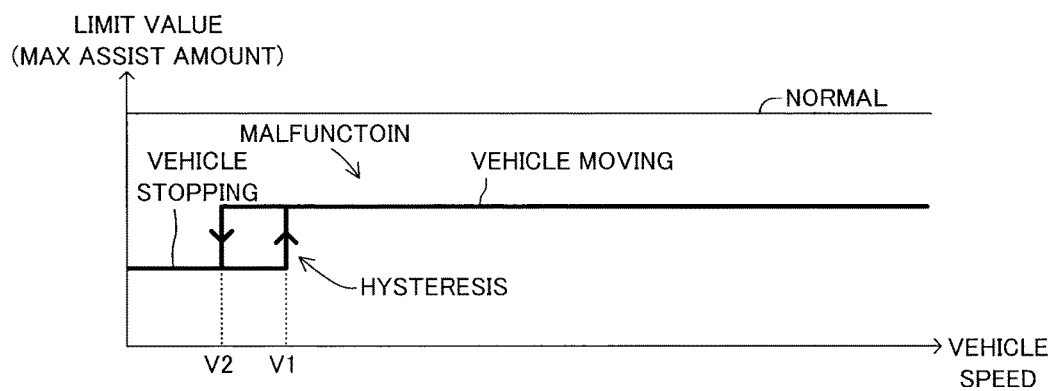
FIG. 18 is a graph showing a relationship between the vehicle speed referred by the limiter part shown in FIG. 16 and the limit value (the maximum assist amount), the relationship having a hysteresis.

It should be noted that as shown by the dashed line in FIG. 17, the limit value (the maximum assist amount) which is obtained by gradually increasing the limit value (the maximum assist amount) at the vehicle stopping under the malfunction state as the received vehicle speed V increases beyond the vehicle speed V1, may be determined as the limit value (the maximum assist amount) at the vehicle moving under the malfunction state. Further, as shown in FIG. 18, a hysteresis property may be formed between the vehicle speeds V1 and V2 and the limit value (the maximum assist amount) at the vehicle stopping under the malfunction state may be switched to the limit value (the maximum assist amount) at the vehicle moving under the malfunction state at the vehicle speed V1, while the limit value (the maximum assist amount) at the vehicle moving under the malfunction state may be switched to the limit value (the maximum assist amount) at the vehicle stopping under the malfunction state at the vehicle speed V2 lower than the vehicle speed V1. When the limit value (the maximum assist amount) is switched between the values at the vehicle stopping and moving under the malfunction state, a hunching due to the switching can be effectively prevent from generating.

Figure 19:
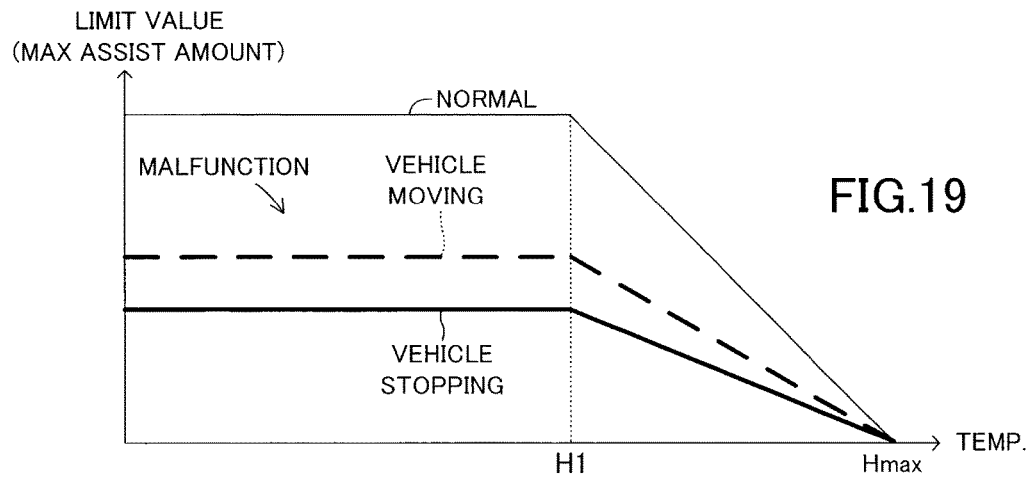
FIG. 19 is a graph showing a relationship between the temperature of the EPS motor referred by the limiter part shown in FIG. 16 and the limit value (the maximum assist amount).

Further, as shown in FIG. 19, when it is judged that it is under the normal state where no malfunction occurs in the first and second assist systems on the basis of the judgment result of the malfunction judgment function, the limiter part 39 determines the limit value (the maximum assist amount) such that the determined limit value gradually decreases, for example, as the temperature H of the EPS motor 15 rises beyond the first predetermined temperature H1. That is, in this case, the limiter part 39 supplies the assist amount Tn, which is obtained by adding the limit value (the maximum assist amount) determined as described above to the assist amount Tn received from the normal state assist amount calculation part 34, to the normal state assist amount calculation part 34.

On the other hand, as shown in FIG. 19, when it is judged that it is under the malfunction state where a malfunction occurs in one of the first and second assist systems on the basis of the judgment result of the malfunction judgment function, the limiter part 39 determines the limit value (the maximum assist amount) depending on whether the vehicle stops or moves such that the determined limit value gradually decreases, for example, as the temperature H of the EPS motor 15 increases beyond the first predetermined temperature H1. That is, in this case, the limiter part 39 calculates the assist amount Tf which is obtained by adding the limit value (the maximum assist amount), which is determined such that the limit value at the vehicle stopping is smaller than the limit value at the vehicle moving, to the assist amount Tn received from the normal state assist amount calculation part 34 and supplies the calculated assist amount Tf to the assist amount switching part 36.

Therefore, according to this modification, the advantages similar to the advantages of the embodiments and modification described above can be expected.

The invention is not limited to the embodiments and modifications described above and various modifications can be employed without departing from the scope of the object of the invention.

For example, the device 10 according to the embodiments and modifications described above is realized such that the first wire winding group U1, V1 and W1 (U1', V1' and W1') and the second wire winding group U2, V2 and W2 (U2', V2' and W2') are provided in one EPS motor 15 mounted on the rack bar 14 and the first and second drive circuits 25 and 26 are electrically connected to the first wire winding group U1, V1 and W1 (U1', V1' and W1') and the second wire winding group U2, V2 and W2 (U2', V2' and W2'), respectively. Further, the device 10 according to the embodiments and modifications described above is realized such that a plurality of the assist system for driving the EPS motor 15 to generate the assist force (the assist torque) is formed by the first assist system configured by the first wire winding group U1, V1 and W1 (U1', V1' and W1') and the first drive circuit 25 and the second assist system configured by the second wire winding group U2, V2 and W2 (U2', V2' and W2') and the second drive circuit 26.

In this case, one set of the EPS motors having wire windings may be mounted on two or more rack bars 14, respectively and a plurality of drive circuits may be provided corresponding to the EPS motors, respectively. In this case, the respective EPS motor and drive circuit forms a plurality of the assist systems. Alternatively, two or more EPS motors 15 having the first wire winding group U1, V1 and W1 (U1', V1' and W1') and the second wire winding group U2, V2 and W2 (U2', V2' and W2') may be mounted on the rack bar 14.

Further, the device 10 according to the embodiments and modifications described above is realized as the rack assist type in which the EPS motor 15 transmits the assist torque to the rack bar 14 of the turning gear unit U. In this case, according to the other modification, a pinion assist type in which the EPS motor 15 transmits the assist torque to the pinion gear 13 may be employed or a column assist type in which the EPS motor 15 transmits the assist torque to a column main shaft which forms the steering shaft 12 via a predetermined reduction mechanism may be employed. In these cases, the advantages similar to the advantages of the embodiments and modifications described above can be expected.

Further, according to the embodiments and modifications described above, the limit value (the maximum assist amount) is changed depending on the temperature H of the EPS motor 15. In this case, the invention is not limited to the temperature H of the EPS motor 15 and for example, the limit values may be calculated, respectively on the basis of the temperatures such as the electronic control unit (the microcomputer) 24 and the switching elements (MOSFET) SW111, SW112, SW121, SW122, SW131, SW132, SW211, SW212, SW221, SW222, SW231 and SW232, the shunt resistances J11, J12, J13, J21, J22 and J23, the power source relays Rd1 and Rd2, the phase open relays R11, R12, R13, R21, R22 and R23, the reactor S and the capacitors C1 and C2 which form the first and second drive circuits 25 and 26 and the minimum limit value among the calculated limit values may be employed. Even in this case, the advantages similar to the advantages of the embodiments and modifications described above can be expected.

The invention claimed is:

1. An electric power steering device for a vehicle, comprising:
   at least one electric motor configured to add a predetermined assist force for assisting a steering wheel manipulation by a driver;
   a plurality of assist systems including said electric motor, said assist systems electromagnetically driving said electric motor;
   an electronic control unit configured to calculate an assist amount representing said predetermined assist force by using a manipulation force input by said driver via a steering wheel and control an assist to said steering wheel manipulation by using at least one of said assist systems on the basis of said calculated assist amount,
   wherein when a malfunction occurs in a first assist system of said assist systems, said electronic control unit is configured to:
   calculate a non-zero assist amount at one of vehicle stopping and moving while controlling a maximum assist amount at the vehicle stopping representing a non-zero maximum assist force added by said electric motor at the vehicle stopping to an amount smaller than a maximum assist amount at the vehicle moving representing a maximum assist force added by said electric motor at the vehicle moving;
   control the assist to said steering wheel manipulation by using a second assist system, of said assist systems, other than said first assist system where the malfunction occurs, on the basis of said calculated non-zero assist amount at the vehicle stopping or moving;
   when the vehicle is stopped, control the assist to said steering wheel manipulation by using the second assist system on the basis of said calculated non-zero assist amount at the vehicle stopping; and
   when an acquired temperature acquired at a portion which generates heat due to the driving of said electric motor included in at least said second assist system of said assist systems exceeds a first predetermined temperature, calculate the non-zero assist amounts at the vehicle stopping while decreasing said non-zero maximum assist amount at the vehicle stopping as said acquired temperature rises.

2. The electric power steering device for the vehicle of claim 1, wherein said maximum assist amount at the vehicle moving is determined as an amount smaller than or equal to an assist amount representing an upper limit of an assist force capable of being generated by said electric motor included in said second assist system.

3. The electric power steering device for the vehicle of claim 1, wherein when the malfunction occurs in the first assist system, said electronic control unit is configured to calculate one of the non-zero assist amounts at the vehicle stopping and moving on the basis of a relationship between the manipulation force input by said driver and the assist amount representing the assist force added by said electric motor at the vehicle stopping or moving.

4. The electric power steering device for the vehicle of claim 3, wherein a relationship between the manipulation force and the assist amount under a state where no malfunction occurs in said assist systems is employed as said relationship between the manipulation force input by said driver and the assist amount representing the assist force added by said electric motor.

5. The electric power steering device for the vehicle of claim 1, wherein said electronic control unit is configured to set the same amount to said maximum assist amounts at the vehicle stopping and moving, respectively only when said acquired temperature is lower than a second predetermined temperature for judging if said maximum assist amount at the vehicle stopping should be decreased.

6. The electric power steering device for the vehicle of claim 5, wherein said electronic control unit is configured to determine said maximum assist amounts at the vehicle stopping and moving as an assist amount representing an upper limit of the assist force capable of being generated by said electric motor included in said second assist system.

7. The electric power steering device for the vehicle of claim 5, wherein said second predetermined temperature for judging if said maximum assist amount at the vehicle stopping should be decreased is determined as a temperature lower than said first predetermined temperature for judging if said maximum assist amount at the vehicle moving should be decreased.

8. The electric power steering device for the vehicle of claim 7, wherein said first predetermined temperature for judging if said maximum assist amount at the vehicle moving is determined as a temperature judged that said acquired temperature cannot reach within a predetermined target time period by the manipulation of said steering wheel by said driver at the vehicle stopping on the basis of a balance of heat generation and radiation amounts at a portion which generates heat due to the driving of said electric motor.

9. The electric power steering device for the vehicle of claim 1, wherein said assist systems include a plurality of wire winding groups provided in said electric motor and drive circuits connected to said wire winding groups, respectively.

\* \* \* \* \*